(12) United States Patent
Radwin et al.

(10) Patent No.: US 11,587,361 B2
(45) Date of Patent: Feb. 21, 2023

(54) MOVEMENT MONITORING SYSTEM

(71) Applicant: WISCONSIN ALUMNI RESEARCH FOUNDATION, Madison, WI (US)

(72) Inventors: Robert G. Radwin, Waunakee, WI (US); Runyu L. Greene, Madison, WI (US); Xuan Wang, Madison, WI (US); Yu Hen Hu, Middleton, WI (US); Nicholas Difranco, Naperville, IL (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 47 days.

(21) Appl. No.: 17/091,903

(22) Filed: Nov. 6, 2020

(65) Prior Publication Data
US 2021/0142048 A1 May 13, 2021

Related U.S. Application Data

(60) Provisional application No. 62/932,802, filed on Nov. 8, 2019.

(51) Int. Cl.
*G06V 40/20* (2022.01)
*G06N 20/00* (2019.01)
(Continued)

(52) U.S. Cl.
CPC ............. *G06V 40/23* (2022.01); *G06N 20/00* (2019.01); *G06T 7/246* (2017.01); *G06T 7/62* (2017.01);
(Continued)

(58) Field of Classification Search
CPC ...... G06V 40/23; G06V 20/52; G06V 40/103; G06V 40/28; G06N 20/00; G06N 5/003;
(Continued)

(56) References Cited

U.S. PATENT DOCUMENTS

| 5,521,841 A | 5/1996 | Arman et al. |
| 5,708,767 A | 1/1998 | Yeo et al. |

(Continued)

FOREIGN PATENT DOCUMENTS

| EP | 1259076 A2 | 11/2002 |
| EP | 1403817 A1 | 3/2004 |

(Continued)

OTHER PUBLICATIONS

Stone, "An asymptotic equivalence of choice of model by cross-vailidation and Akaike's criterion," Journal of the Royal Statistical Society: Series B (Methodological), vol. 39, No. 1, pp. 44-47,1977.

(Continued)

*Primary Examiner* — Amara Abdi
(74) *Attorney, Agent, or Firm* — Seager, Tufte & Wickhem LLP

(57) ABSTRACT

A monitoring or tracking system may include an input port and a controller in communication with the input port. The input port may receive data from a data recorder. The data recorder is optionally part of the monitoring system and in some cases includes at least part of the controller. The controller may be configured to receive data via the input port and determine values for one or more dimensions of subject performing a task based on the data and determine a location of a hand of the subject performing the task based on the data. Further, the controller may be configured to determine one or both of trunk angle and trunk kinematics based on the received data. The controller may output via the output port assessment information.

24 Claims, 22 Drawing Sheets

(51) Int. Cl.
*G06T 7/73* (2017.01)
*G06T 7/62* (2017.01)
*G06T 7/246* (2017.01)

(52) U.S. Cl.
CPC ...... *G06T 7/73* (2017.01); *G06T 2207/10016* (2013.01); *G06T 2207/30196* (2013.01)

(58) Field of Classification Search
CPC .. G06T 7/246; G06T 7/62; G06T 7/73; G06T 2207/10016; G06T 2207/30196; G06K 9/6282
See application file for complete search history.

(56) References Cited

U.S. PATENT DOCUMENTS

| | | |
|---|---|---|
| 5,821,945 A | 10/1998 | Yeo et al. |
| 5,828,809 A | 10/1998 | Chang et al. |
| 5,969,755 A | 10/1999 | Courtney |
| 5,974,235 A | 10/1999 | Nunally et al. |
| 6,181,867 B1 | 1/2001 | Kenner et al. |
| 6,222,532 B1 | 4/2001 | Ceccarelli |
| 6,400,890 B1 | 6/2002 | Nagasaka et al. |
| 6,424,370 B1 | 7/2002 | Courtney |
| 6,445,409 B1 | 9/2002 | Ito et al. |
| 6,628,835 B1 | 9/2003 | Brill et al. |
| 6,643,387 B1 | 11/2003 | Sethuraman et al. |
| 6,721,454 B1 | 4/2004 | Qian et al. |
| 6,724,915 B1 | 4/2004 | Toklu et al. |
| 6,754,389 B1 | 6/2004 | Dimitrova et al. |
| 6,779,027 B1 | 8/2004 | Schunicht et al. |
| 6,845,357 B2 | 1/2005 | Shetty et al. |
| 6,879,709 B2 | 4/2005 | Tian et al. |
| 6,940,474 B2 | 9/2005 | Weitbruch et al. |
| 6,940,998 B2 | 9/2005 | Garoutte |
| 7,020,336 B2 | 3/2006 | Cohen-Solal et al. |
| 7,068,842 B2 | 6/2006 | Liang et al. |
| 7,076,102 B2 | 7/2006 | Lin et al. |
| 7,106,885 B2 | 9/2006 | Osterweil et al. |
| 7,200,266 B2 | 4/2007 | Ozer et al. |
| 7,227,569 B2 | 6/2007 | Maruya |
| 7,330,566 B2 | 2/2008 | Cutler |
| 7,346,186 B2 | 3/2008 | Sharoni et al. |
| 8,009,918 B2 | 8/2011 | Van Droogenbroeck et al. |
| 9,053,516 B2 | 6/2015 | Stempora |
| 9,204,823 B2 | 12/2015 | Derenne et al. |
| 9,566,004 B1 | 2/2017 | Radwin et al. |
| 10,395,373 B1 | 8/2019 | Brewster et al. |
| 10,849,532 B1* | 12/2020 | Santel .............. A61B 5/1071 |
| 2001/0010541 A1 | 8/2001 | Fernandez et al. |
| 2001/0016007 A1 | 8/2001 | Wu et al. |
| 2003/0048926 A1 | 3/2003 | Watanabe |
| 2003/0051026 A1 | 3/2003 | Carter et al. |
| 2003/0053659 A1 | 3/2003 | Pavlidis et al. |
| 2003/0123703 A1 | 7/2003 | Pavlidis et al. |
| 2003/0126293 A1 | 7/2003 | Bushey |
| 2004/0080615 A1 | 4/2004 | Klein et al. |
| 2004/0081333 A1 | 4/2004 | Grab et al. |
| 2004/0120548 A1 | 6/2004 | Qian |
| 2004/0130620 A1 | 7/2004 | Buehler et al. |
| 2004/0141636 A1* | 7/2004 | Liang ...................... G06T 7/20 382/110 |
| 2006/0045185 A1 | 3/2006 | Kiryati et al. |
| 2006/0204045 A1 | 9/2006 | Antonucci |
| 2006/0215752 A1 | 9/2006 | Lee et al. |
| 2006/0215753 A1 | 9/2006 | Lee et al. |
| 2006/0227862 A1 | 10/2006 | Campbell et al. |
| 2006/0239645 A1 | 10/2006 | Curtner et al. |
| 2009/0087027 A1* | 4/2009 | Eaton ...................... G06F 15/16 382/103 |
| 2009/0135009 A1* | 5/2009 | Little ...................... G06Q 40/08 705/4 |
| 2011/0107216 A1* | 5/2011 | Bi ........................... G06F 3/0481 715/863 |
| 2011/0262002 A1* | 10/2011 | Lee ......................... G06F 3/017 382/103 |
| 2012/0065924 A1 | 3/2012 | Nielsen et al. |
| 2012/0327220 A1 | 12/2012 | Ma |
| 2013/0164722 A1* | 6/2013 | Yoshimitsu ............ G06V 20/52 434/236 |
| 2013/0201147 A1 | 8/2013 | Paulsen et al. |
| 2014/0003725 A1 | 1/2014 | Kawano |
| 2014/0254863 A1 | 9/2014 | Marks et al. |
| 2015/0002704 A1* | 1/2015 | Vidal-Naquet ...... H04N 5/2355 348/241 |
| 2015/0154459 A1 | 6/2015 | Park |
| 2015/0264357 A1 | 9/2015 | Alfonso |
| 2016/0150219 A1 | 5/2016 | Gordon et al. |
| 2018/0285634 A1 | 10/2018 | Varadarajan et al. |
| 2018/0374233 A1 | 12/2018 | Zhou et al. |
| 2019/0350523 A1* | 11/2019 | Bailey .................... H04W 4/70 |
| 2020/0050839 A1 | 2/2020 | Wolf et al. |

FOREIGN PATENT DOCUMENTS

| | | | |
|---|---|---|---|
| JP | 2000276577 A | 10/2000 | |
| JP | 2005295255 A | 10/2005 | |
| WO | 0163576 A2 | 8/2001 | |
| WO | 2007000637 A2 | 1/2007 | |

OTHER PUBLICATIONS

Van Den Oord et al; WaveNet: A generative model for raw audio. SSW, 125, 2016.

Wang et al; "Frame-subsampled, drift-resilient video object tracking," IEEE International Conference on Multimedia and Expo (ICASSP). 2018.

Waters et al; "New procedure for assessing sequential manual lifting jobs using the revised NIOSH lifting equation," Ergonomics, vol. 50, No. 11, pp. 1761-1770, 2007.

Waters et al; "Variable Lifting Index (VLI) A New Method for Evaluating Variable Lifting Tasks," Human Factors, vol. 58, No. 5, pp. 695-711, 2016.

Zhou et al; "Statistical Methods in Diagnostic Medicine," vol. 569, John Wiley & Sons, doi: 10.1002/9780470317082, 2002.

Greene et al; "Estimating Trunk Angles During Lifting Using Computer Vision Boubding Boxes," University of Wisconsin—Madison, 2019.

Dahlqvist et al; "Validity of a small low-cost triaxial accelerometer with integrated logger for uncomplicated measurements of postures and movements of head, upper back and upper arms," Applied ergonomics, vol. 55, pp. 108-116, 2016.

David, "Ergonomic methods for assessing exposure to risk factors for work-related musculoskeletal disorders," Occupational medicine, vol. 55, No. 3, pp. 190-199, 2005.

Ferguson et al; "Musculoskeletal disorder risk as a function of vehicle rotation angle during assembly tasks," Applied ergonomics, vol. 42, No. 5, pp. 699-709, 2011.

Hignett et al; "Rapid entire body assessment (REBA)," Applied ergonomics, vol. 31, No. 2, pp. 201-205, 2000.

Hoogendorn et al; "Physical load during work and leisure time as risk factors for back pain," Scandinavian Journal of work, environment & health, pp. 387-403, 1999.

Lavender et al; "Developing physical exposure-based back injury risk models applicable to manual handling jobs in distribution centers", Journal of occupational and environmental hygiene, vol. 9, No. 7, pp. 450-459, 2012.

Lavender et al; "Comparison of five methods used to determine low back disorder risk in a manufacturing environment," Spine, vol. 24, No. 14, p. 1441, 1999.

Lowe et al; "Ergonomics assessment methods used by ergonomics professionals," Applied Ergonomics, vol. 81, 102882, 2019.

Lu et al; "Development of an algorithm for automatically assessing lifting risk factors using inertial measurement units," In Proceedings of the Human Factors and Ergonomics Society Annual Meeting (vol. 63, No. 1, pp. 1334-1338). Sage CA: Los Angeles, CA: SAGE Publications. Nov. 2019.

(56) References Cited

OTHER PUBLICATIONS

Lu et al; "Development of human posture simulation method for assessing posture angles and spinal loads," Human Factors and Ergonomics in Manufacturing & Service Industries, vol. 25, No. 1, pp. 123-136, 2015.

Marras et al; "The effectiveness of commonly used lifting assessment methods to identify industrial jobs associated with elevated risk of low-back disorders," Ergonomics, vol. 42, No. 1, pp. 229-245, 1999.

Marras et al, "Biomechanical risk factors for occupationally related low back disorders," Ergonomics, vol. 38, No. 2, pp. 377-410, 1995.

Mehrizi et al; Predicting 3-D lower back joint load in lifting: A deep pose estimation approach. IEEE Transactions on Human-Machine Systems, vol. 49, No. 1, pp. 85-94, 2019.

Mehrizi et al; Toward marker-free 3D pose estimation in lifting: A deep multi-view solution. In 2018 13th IEEE International Conference on Automatic Face & Gesture Recognition (FG 2018) (pp. 485-491). IEEE, May 2018.

Peek-Asa et al; "Incidence of acute low-back injury among older workers in a cohort of material handlers," Journal of occupational and environmental hygiene, vol. 1, No. 8, pp. 551-557E, 2004.

Venables et al; Modern Applied Statistics with S. Fourth Edition. Springer, New York. ISBN 0-387-95457-0, 2002.

Waters et al; Applications manual for the revised NIOSH lifting equation, 1994.

Xiao et al; "Simple baselines for human pose estimation and tracking," Proceedings of the European Conference on Computer Vision, pp. 466-48, 2018.

Akkas et al; "A hand speed and duty cycle equation for estimating the ACGIH in hand activity level rating," Ergonomics, vol. 58, No. 2, pp. 184-194, 2015.

Akkas et al; "Measuring elemental time and duty cycle using automated video processing," Ergonomics, vol. 59, No. 11, pp. 1514-1525, 2016.

Akkas et al; "Measuring exertion time, duty cycle and hand activity for industrial tasks using computer vision," Ergonomics, vol. 60, No. 12, pp. 1730-1738, 2017.

Akkas et al; "The Speed Calculated Hand Activity Level (HAL) Matches Observer Estimates Better than the Frequency Calculated HAL," 20th Congress of International Ergonomics Association—IEA 2018, Florence, Italy, 2018.

Akkas et al, "How Do Computer Vision Upper Extremity Exposure Measures Compare Against Manual Measures?," Human Factors and Ergonomics Society Annual Meeting, Philadelphia, PA. 2018.

U.S. Bureau of Labor Statistics: Injuries, Illnesses and Fatalities, https://www.bls.gov/news.release/osh.nr0.htm. 2018. Last Modified Nov. 7, 2019.

Chang et al; "Dropout Feature Ranking for Deep Learning Models," arXiv preprint arXiv:1712.08645. 2017.Chang.

Chen et al; "A Motion Tracking System for Hand Activity Assessment," ChinaSIP, Xi'an, China, Jul. 2014.

Chen et al; "Automated Video Exposure Assessment of Repetetive Hand Motion," Human Factors, ,vol. 55, No. 2, pp. 298-308, 2013.

Seo et al; "Simulation-based assessment of workers' muscle fatigue and its impact on construction operations," Journal of Construction Engineering and Management, vol. 142, No. 11, 04016063, 2016.

Chen et al; "The accuracy of conventional 2D video for quantifying upper limb kinematics in repetitive motion occupational tasks," Ergonomics, vol. 58, No. 12, pp. 2057-2066, 2015.

Dempsey, "Usability of the revised NIOSH lifting equation," Ergonomics, vol. 45: pp. 817-828, 2002.

Lowe, "Assessment Methods Used by Certified Ergonomics Professionals," In Proceedings of the Human Factors and Ergonomics Society Annual Meeting (vol. 62, No. 1, pp. 838-842), Sep. 2018.

Ferguson et al; "Prevalence of low back pain, seeking medical care and lost time due to low back pain among manual material handling workers in the United States," BMC musculoskelatal disorders, vol. 20, No. 1, pp. 243, 2019.

Frasier et al; A marker-less technique for measuring kinematics in the operating room, Surgery, vol. 160, No. 5, pp. 1400-1413, 2016.

Gal et al; "Concrete dropout," In Advances in Neural Information Processing Systems 30. pp. 3851-3590, 2017.

Glarner et al; "Quantifying technical skills during open operations using video-based motion analysis," Surgery, vol. 156, No. 3, pp. 729-734, 2014.

Graves et al; "Speech recognition with deep recurrent neural networks," In IEEE international conference on acoustics, speech and signal processing, pp. 6645-6649, 2013.

Greene et al; "Visualizing stressful aspects of repetitive motion tasks and opportunities for ergonomic improvements using computer vision," Applied Ergonomics, vol. 65, pp. 461-472, 2017.

He et al; "Mask R-CNN," In Proceedings of the IEEE International Conference on Computer vision, pp. 2961-2969, 2017.

Juul-Kristensen et al; "Assessment of work postures and movements using a video-based observation method and direct technical measurements," Applied Ergonomics, vol. 32, No. 5, pp. 517-524, 2001.

Kim et al; "Performance evaluation of a wearable inertial motion capture system for capturing physical exposures during manual material handling tasks," Ergonomics, vol. 56, No. 2, pp. 314-326, 2013.

Lavender et al; "Designing ergonomic interventions for EMS workers—part II lateral transfers," Applied Ergonomics, vol. 38, No. 2, pp. 227-236, 2007.

Li et al; "Current techniques for assessing physical exposure to work-related musculoskeletal risks, with emphasis on posture-based methods," Ergonomics, vol. 42, No. 5, pp. 674-695, 1999.

Liberty Mutual Research Institute for Safety. Liberty Mutual Workplace Safety Index, Liberty Mutual 175 Berkeley St. Boston, MA 02116, 2017.

Lu et al; "Evaluation of the impact of the revised National Institute for Occupational Safety and Health Lifting Equation," Human Factors, vol. 58, No. 5, pp. 667-682, 2016.

Mehrizi et al; "A computer vision based method for 3D posture estimation of symmetrical lifting," Journal of Biomechanics, vol. 69, pp. 40-46, 2018.

Nakamoto et al; "Joint angle measurement by stretchable strain sensor," Journal of Ambient Intelligence and Humanized Computing, pp. 1-6, 2018.

Pepe et al; "Testing for improvement in prediction model performance," Statistics in Medicine, vol. 32, No. 9, pp. 1467-1482, 2013.

Radwin et al; "Automated Computer Vision Exposure for Repetitive Motion Jobs," Ninth International Conference on the Prevention of Work-Related Musculoskeletal Disorders, Toronto, 2016.

Radwin et al; "A frequency-duty cycle equation for the ACGIH hand activity level," Ergonomics, vol. 58, No. 2, pp. 173-183, 2015.

American Conference of Governmental Industrial Hygenists. TLV®/BEI® introduction . Retrieved from https://wwwacgig.org/tlv-bei-guidelines/tlv-bei introduction. 2018.

Bernard et al; "Musculoskeletal Disorders and Workplace Factors; a Critical Review of Epidemiologic Evidence for Work-Related Musculoskeletal Disorders of the Neck, Upper Extremity and Low Back," 1997.

Bigos et al; Back Injuries in Industry: A Retrospective Study. II. Injury Factors, Spine, vol. 11, No. 3, pp. 246-251, 1986.

Chaffin et al; "An Empirical Investigation of Low Back Strains and Vertabrae Geometry," Journal of Biomechanics, vol. 2, No. 1, pp. 89-96, 1969.

Chaffin, "Occupational Biomechanics," Wiley Interscience , pp. 37-51, 2006.

Chaffin, "Digital Human Modeling for Workspace Design. Reviews of Human Factors and Ergonomics," vol. 4, No. 1, pp. 41-74, 2008.

Da Costa et al; "Risk factors for Work-Related Musculoskeletal Disorders: A Systematic Review of Recent Longitudinal Studies," vol. 53, No. 3, pp. 285-323, 2010.

Dempsey et al; "An International Survey of Tools and Methods Used by Certified Ergonomics Professionals," In Congress of the International Ergonomics Association pp. 223-230, Springer, Cham. Aug. 2018.

Ding et al; "A Real-Time Webcam Based Method for Assessing Upper-Body Postures," Machine Vision and Applications, 1-18. 2019.

(56) References Cited

OTHER PUBLICATIONS

Engkivst et al; "Risk Indicators for Reported Over-Exertion Back Injuries among Female Nursing Personnel," Epidemiology, vol. 11, No. 5, pp. 519-522, Sep. 2000.
Eriksen et al; "Smoking, Heavy Physical Work and Low Back Pain: A Four Year Prospective Study," Occupational Medicine, vol. 49, No. 3, pp. 155-160, 1999.
Ferguson et al; "Biomechanical, Psychosocial and Individual Risk Factors Predicting Low Back Functional Impairment among Furniture Distribution Employees," Clinical Biomechanics, vol. 27, No. 2, pp. 117-123, 2012.
Frievalds et al; "A Dynamic Biomechanical Evaluation of Lifting Maximum Acceptable Loads," Journal of Biomechanics, vol. 17, No. 4, pp. 251-262, 1984.
Gordon et al; "2012 Anthropometric Survey of US Army Personnel: Methods and Summary Statistics," (No. NATICK/TR-15/007). Army Natick Soldier Research Development and Engineering Center MA.) 2014.
Greene et al; "Predicting Sagittal Plane Lifting Postures from Image Bounding Box Dimensions," Human Factors, vol. 61, No. 1, pp. 64-77, 2019.
Hoffman et al; "Predicting Force-Exertion Postures from Task Variables," (No. 2007-01-2480). SAE Technical Paper, 2007.
Hölmstrom et al; "Low Back and Neck/Shoulder Pain in Construction Workers: Occupational Workload and Psychosocial Risk Factors. Part 2 Relationship to Neck and Shoulder Pain," Spine, vol. 17, No. 6, pp. 672-677, 1992.
Katz, "Lumbar Disc Disorders and Low-Back Pain: Socioeconomic Factors and Consequences," JBJS, 88, 21-24, 2006.
Kerr et al; "Biomechanical and Psychosocial Risk Factors for Low Back Pain at Work," American Journal of Public Health, vol. 91,No. 7, p. 1069, 2001.
Kim et al; "Whole Body Vibration Exposures in Long-Haul Truck Drivers," In Proceedings of the Human Factors and Ergonomics Society Annual Meeting (vol. 59, No. 1, pp. 1274-1278). Sage, CA: Los Angeles, CA: SAGE Publications, Sep. 2015.
Kuiper et al; "Epidemiologic Evidence on Manual Materials Handling as a Risk Factor for Back Disorders: a Systematic Review," International Journal of Industrial Ergonomics, vol. 24, No. 4, pp. 389-404, 1999.
Lavender, "The Effects of Initial Lifting Height, Load Magnitude and Lifting Speed on the Peak Dynamic L5/S1 Moments," International Journal of Industrial Ergonomics, vol. 31, No. 1, pp. 51-59, 2003.
Lavender et al; "An Electromyographic and Kinematic Comparison between an Extendable Conveyor System and an Articulating Belt Conveyor Used for Truck Loading and Unloading Tasks." Applied Ergonomics, vol. 58, pp. 398-404, 2017.
Marras et al; "A Three Dimensional Motion Model of Loads on the Lumbar Spine: I. Model Structure." Human Factors, vol. 33, No. 2, pp. 123-137, 1991.
Marras et al; "Accuracy of a Three-Dimensional Lumbar Motion Monitor for Recording Dynamic Trunk Motion Characteristics." International Journal of Industrial Ergonomics, vol. 9, No. 1, pp. 75-87, 1992.
Marras et al; "The Role of Dynamic Three-Dimensional Trunk Motion in Occupationally-Related." Spine, vol. 18, No. 5, pp. 617-628, 1993.
Marras et al; "Quantitative Dynamic Measures of Physical Exposure Predict Low Back Functional Impairment," Spine, vol. 35, No. 8, pp. 914-923. Meeting. 2010. http://doi.org/10.1177/1541931215591205, 2010.
McGill et al; "Partitioning of the L4-L5 Dynamic Moment into Disc, Ligamentous, and Muscular Components during Lifting," Spine, vol. 11, No. 7, pp. 666-678, 1986.
Myers et al; "Back Injury in Municipal Workers: A Case-Control Study," American Journal of Public Health, vol. 89, No. 7, pp. 1036-1041, 1999.
Nakamoto et al; "Wearable Lumbar-Motion Monitoring Device with Stretchable Strain Sensors," Journal of Sensors, 7 pages, 2018.
Norsai, et al; "Effect of Load Weight and Starting Height on the Variablity of Trunk Kinematics," In Proceedings of the Human Factors and Ergonomics Society Annual Meeting (vol. 62, No. 1, pp. 905-909). Sage, CA: Los Angeles, CA: SAGE Publications, year: 2018.
Patrizi et al; "Comparison Between Low-Cost Marker-Less and High End Marker-Based Motion Capture Systems for the Computer-Aided Assessment of Working Ergonomics," Ergonomics, vol. 59, No. 1, pp. 155-162, 2016.
Seo et al; "Automated Postural Ergonomic Asessment Using a Computer Vision-Based Posture Classification," In Construction Research Congress, pp. 809-818, 2016.
Snook, "Low Back Pain in Industry. In Symposium on Idiopathic Low Back Pain," pp. 23-38, St. Louis: Mosby Company, 1992.
Snook, "The Control of Low Back Disability: the Role of Management. Manual Material Handling: Understanding and Preventing Back Trauma," 1989.
Spengler et al; "Back Injuries in Industry: A Retrospective Study. I. Overview and Cost Analysis," vol. 11, No. 3,, pp. 241-245, 1986.
Van Poppel et al; "Risk Factors for Back Pain Incidence in Industry: A Prospective Study," Pain, vol. 77, No. 1, pp. 81-86, 1998.
University of Michigan Center for Ergonomics. 3DSSPP Software. Retrieved from https://c4e.engin.umich.edu/toolservices/3dsspp-software/. 2021.
U.S. Bureau of Labor Statistics, Back Injuries Prominent in Work-Related Musculoskelatal Disorder Cases in 2016. Retrieved from https://bls.gov/opub/ted/2018/back-injuries-prominent-in-work-related-musculoskeletal-disorder-cases-in-2016.htm, 2018.
Wang et al; "The Accuracy of a 2D Video Based Lifting Monitor," Ergonomics, (just-accepted), pp. 1-33, 2019.
Waters et al; "Revised NIOSH Equation for the Design and Evaluation of Manual Lifting Tasks," Ergonomics, vol. 36, No. 7, pp. 749-776, 1993.
World Health Organization, "Priority Diseases and Reasons for Inclusion," Chapter 6.22—Pneumonia. 2014.
Yang et al; "Low-Back Pain Prevalence and Related Workplace Psychosocial Risk Factors: A Study Using Data from the 2010 National Health Interview Survey," Journal of Manipulative Physiological Therapeutics, vol. 39, No. 7, pp. 459-472, 2016.
Yen et al; "A Video-Based System for Acquiring Biomechanical Data Synchronized with Arbitrary Events and Activities," IEEE Transactions on Biomedical Engineering, vol. 42, No. 9, pp. 944-948, 1995.
Greene et al; "Estimating Trunk Angle Kinematics During Lifting Using a Computationally Efficient Computer Vision Method," Human Factors, pp. 1-18, 2020.
Arjmand et al; "Revised NIOSH Lifting Equation May generate spine loads exceeding recommended limits," International Journal of Industrial Ergonomics, vol. 47, pp. 1-8, 2015.
Barim et al; "Accuracy of An Algorithm Using Motion Data Of Five Wearable IMU Sensors For Estimating Lifting Duration And Lifting Risk Factors." In Proceedings of the Human Factors and Ergonomics Society Annual Meeting (vol. 63, No. 1, pp. 1105-1111). Sage CA: Los Angeles, CA: SAGE Publications, Nov. 2019.
Battini et al; "Innovative real-time system to integrate ergonomic evaluations into warehouse design and management," Computers & Industrial Engineering, vol. 77, pp. 1-10, 2014.
Breen et al; "Evaluation of a single accelerometer based biofeedback system for real-time correction of neck posture in computer users," In 2009 Annual International Conference of the IEEE Engineering in Medicine and Biology Society (pp. 7269-7272). IEEE, Sep. 2009.
Callaghan et al; "An evaluation of predictive methods for estimating cumulative spinal loading," Ergonomics, vol. 44, No. 9, pp. 825-837, 2001.
Lipton, "ObjectVideo Forensics: Activity-Based Video Indexing and Retrieval for Physical Security Applications," ObjectVideo, pp. 1-18, date accessed 2009.
Lipton et al., "Critical Asset Protection, Perimeter Monitoring, and Threat Detection Using Automated Video Surveillance," ObjectVideo, pp. 1-11, date accessed 2009.
Mulls et al., "A Magnifier Tool for Video Data," Human Interface Group/Advanced Technology, pp. 93-98, 1992.

(56) References Cited

OTHER PUBLICATIONS

Porikli et al., "Event Detection by Eigenvector Decomposition Using Object and Frame Features," Mitsubishi Electric Research Laboratories, pp. 1-10, 2004.

Smoliar et al., "Content-Based Video Indexing and Retrieval," IEEE Multimedia, vol. 1(2): 62-72, 1994.

Safetyvideopreviews. Manual Material Handling/Safe Lifting. Retrieved from https://www.youtube.com/watch?v=rrl2n8qehrY&t=8s., 2012.

Zivkovic et al; "Efficient adaptive density estimation per image pixel for the task of background subtraction." Pattern recognition letters 27.7, 773-780, 2006.

Shoushtarian et al; "A practical adaptive approach for dynamic background subtraction using an invariant colour model and object tracking." Pattern Recognition Letters, 26(1):5-26, Jan. 2005.

Medioni et al., "Event Detection and Analysis from Video Streams," IEE Transactions on Pattern Analysis and Machine Intelligence, vol. 23 No. 8, pp. 873-889, Aug. 2001.

Lu et al; "Efficacy of the revised NIOSH lifting equation for predicting risk of low back pain associated with manual lifting: A one-year prospective study." Human Factors 56(1): 73-85 (2014).

Sinop et al; "A Seeded Image Segmentation Framework Unifying Graph Cuts and Random Walker Which Yields A New Algorithm", Proc. of ICCV, 2007.

Rother et al; "GrabCut: Interactive foreground extraction using iterated graph cuts", ACM Trans. Graph., vol. 23, pp. 309-314, 2004.

Piccardi, Background subtraction techniques: a review (PDF). IEEE International Conference on Systems, Man and Cybernetics. 4. pp. 3099-3104, Oct. 2004.

Barnich et al; "ViBe: A universal background subtraction algorithm for video sequences." IEEE Transactions on Image processing 20.6 pp. 1709-1724. 2011.

Kim et al; "Real-time foreground-background segmentation using codebook model." Real-time imaging 11.3 : 172-185. 2005.

Zivkovic, "Improved adaptive Gaussian mixture model for background subtraction." Pattern Recognition, 2004. ICPR 2004 Proceedings of the 17th International Conference on. vol. 2. IEEE, 2004.

Babapour et al; "Adoption of ergonomic features in a new reach truck cabin design—a usability study", Chalmers University of Technology, SE-412 96 Gothenberg, Sweden, IOS press and the authors, pp. 1486-1492, 2012.

Marras et al; "Instrumentation for measuring dynamic spinal load moment exposures in the workplace." Journal of Electromyography and Kinesiology 20.1 , 1-9. 2010.

Luinge et al; "Measuring orientation of human body segments using miniature gyroscopes and accelerometers." Medical and Biological Engineering and computing 43.2 pp. 273-282, 2005.

Borghetti et al. "Wearable Sensors for Human Movement Monitoring in Biomedical Applications: Case Studies." Ambient Assisted Living. Springer International Publishing, pp. 111-123, 2015.

Sedai et al; "A Gaussian process guided particle filter for tracking 3D human pose in video." IEEE Transactions on Image Processing 22.11 pp. 4286-4300, 2013.

Drory et al; "A learning-based markerless approach for full-body kinematics estimation in-natura from a single image." Journal of Biomechanics 55 pp. 1-10, 2017.

Shotton et al. "Real-time human pose recognition in parts from single depth images." Communications of the ACM 56.1 : pp. 116-124. 2013.

Vemulapaali et al; "Human action recognition by representing 3d skeletons as points in a lie group." Proceedings of the IEEE conference on computer vision and pattern recognition. 2014.

Liu et al. "Silhouette-Based On-Site Human Action Recognition in Single-View Video." Construction Research Congress 2016.

Breiman et al; "Classification and re-gression trees". CRC press (2017), 1984.

Bhattacharaya et al; Workers' Compensation Costs in Wholesale and Retail Trade Sectors. National Institute for Occupational Safety and Health . https://www.cdc.gov/NIOSH/docs/2013-147/pdfs/2013%E2%80%93147.pdf. 2012.

U.S. Bureau of Labor Statistics. 2015 Nonfatal Occupational Injuries and Illnesses: Cases with days away from work. (Nov. 2016) https://www.bls.gov/iif/oshwc/osh/case/osch0058.pdf.

National Institute for Organizational Safety & Health. Number, incidence rate, and median days away from work for nonfatal occupational injuries and illnesses involving days away from work for musculoskeletal disorders4 by part of body and ownership, Wisconsin, 2014. (2015) https://www.bls.gov/iif/oshwc/osh/case/wi2014_pob.pdf.

Hwang et al; "Lower extremity joint kinetics and lumbar curvature during squat and stoop lifting." BMC Musculoskeletal Disorders 2009 10:15 (Feb. 2009).

Plantard et al; "Validation of an ergonomic assessment method using Kinect data in real workplace conditions." Applied Ergonomics pp. 1-8. (2016).

Spector et al; "Automation of Workplace Lifting Hazard Assessment for Musculoskeletal Injury Prevention." Annals of Occupational and Environmental Medicine, 26:15 (2014).

Chaffin, "Development of Computerized Human Static Strength Simulation Model for Job Design." Human Factors and Ergonomics in Manufacturing, 7 (4) pp. 305-322. (1997).

University of Michigan Center for Ergonomics. Paper Flopping—Job Modifica-tion. Retrieved from https://www.youtube.com/watch?v=61cu5qvH0kM&index=54&list=PLn5IJRj74S88rnFFV6ObxS6nFdDXUFiGW, 2016.

University of Michigan Center for Ergonomics. Stacking, Facing Line2 CE. Re-trieved from https://www.youtube.com/wratch?v=MxTgvuhVAJA&t=55s, 2017.

Anderson et al; "A Biomechanical Model of the Lumbosacral Joint during Lifting Activities." Journal of Biomechanics, 18 (8), pp. 571-584. (1985).

Dysart et al; "Posture Prediction for Static Sagittal-Plane Lifting." Journal of Biomechanics, 29 (10), pp. 1393-1397. ). http://www.sciencedirect.com/science/article/pii/0021929096000280, Oct. 1996.

Totilo, "Natal Recognizes 31 Body Parts, Uses Tenth of Xbox 360 Computing Resources", http://kotaku.com/5442775/natal-recognizes-31-body-parts-uses-tenth-of-xbox-360-computing-resources. Accessed Jan. 1, 2010.

Straker, "Evidence to support using squat, semi-squat and stoop techniques to lift low-lying objects." International Journal of Industrial Ergonomics, 31, pp. 149-160 (2003).

Burgess-Limerick et al; "Toward a Quantitative Definition of Manual Lifting Postures," Human Factors, 39 (1), pp. 141-148. http://journals.sagepub.com/doi/pdf/10.1518/001872097778940632. 1997.

Mathworks. Decision Trees. https://www.mathworks.com/help/stats/classification-trees-and-regression-trees.html (2017).

Bao et al; "Quantifying repetitive hand activity for epidemiological research on musculoskeletal disorders—Part II: comparison of different methods of measuring force level and repetitiveness.", Ergonomics, 49(4), 381-392, 2006.

Drinkaus et al; "Job Level Risk Assessment Using Task Level ACGIH Hand Activity Level TLV Scores: A Pilot Study", International Journal of Occupational Safety and Ergonomice (JOSE) vol. 11, No. 3, 263-281. 2005.

Burgess_Limerick, "Squat, stoop, or something in between?" International Journal of Industrial Ergonomics, 31, pp. 143-148. (2003).

Wilson, "Testing Project Natal: We Touched the Intangible", http://gizmodo.com/5277954/testing-project-natal-we-touched-the-intangible/. Accessed Jun. 3, 2009.

Schramm "Kinect: The company behind the tech explains how it works", http://www.joystiq.com/2010/06/19/kinect-how-it-works-from-the-company-behind-the-tech/. Accessed Jun. 19, 2010.

Pham, "E3: Microsoft shows off gesture control technology for Xbox 360", http://latimesblogs.latimes.com/technology/2009/06/microsofte3.html. Accessed Jun. 1, 2009.

* cited by examiner

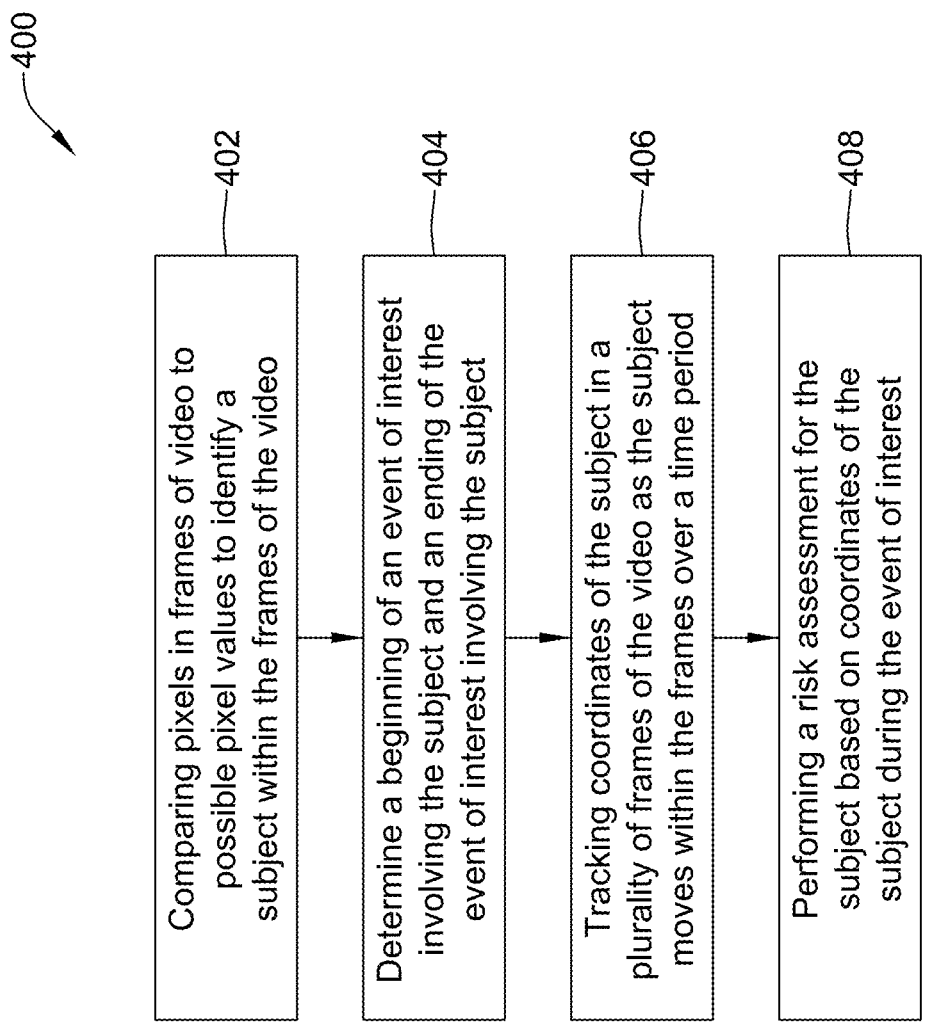

US 11,587,361 B2

MOVEMENT MONITORING SYSTEM

CROSS REFERENCE TO RELATED APPLICATIONS

This application claims the benefit of U.S. Provisional Patent Application Ser. No. 62/932,802, filed on Nov. 8, 2019, the disclosure of which is incorporated herein by reference.

STATEMENT REGARDING FEDERALLY SPONSORED RESEARCH OR DEVELOPMENT

This invention was made with government support under T42 OH008434 and R01 OH011024 awarded by the Center for Disease and Prevention. The government has certain rights in the invention.

TECHNICAL FIELD

The present disclosure pertains to monitoring systems and assessment tools, and the like. More particularly, the present disclosure pertains to video analysis monitoring systems and systems for assessing risks associated with movement and exertions.

BACKGROUND

A variety of approaches and systems have been developed to monitor physical stress on a subject. Such monitoring approaches and systems may require manual observations and recordings, cumbersome wearable instruments, complex linkage algorithms, and/or complex three-dimensional (3D) tracking. More specifically, the developed monitoring approaches and systems may require detailed manual measurements, manual observations over a long period of time, observer training, sensors on a subject, and/or complex recording devices. Of the known approaches and systems for monitoring physical stress on a subject, each has certain advantages and disadvantages.

SUMMARY

This disclosure is directed to several alternative designs for, devices of, and methods of using monitoring systems and assessment tools. Although it is noted that monitoring approaches and systems are known, there exists a need for improvement on those approaches and systems.

Accordingly, one illustrative instance of the disclosure may include a subject tracking system. The subject tracking system may include an input port and a controller in communication with the input port. The input port may receive data related to a subject performing a task. The controller may be configured to determine a value for each of one or more dimensions of the subject performing the task based on the data, determine a location of a hand of the subject performing the task based on the data, and determine one or both of a trunk angle of the subject performing the task and one or more values of trunk kinematics of the subject performing the task based on the value for at least one dimension of the one or more dimensions of the subject performing the task and the location of the hand of the subject performing the task.

Alternatively or additionally to any of the embodiments above, the one or more values of trunk kinematics of the subject performing the task may include a value of a velocity of movement of a trunk of the subject performing the task.

Alternatively or additionally to any of the embodiments above, the one or more values of trunk kinematics of the subject performing the task may include a value of an acceleration of movement of a trunk of the subject performing the task.

Alternatively or additionally to any of the embodiments above, the one or more dimensions of the subject performing the task may include one or both of a height dimension of the subject and a width dimension of the subject.

Alternatively or additionally to any of the embodiments above, the one or more dimensions of the subject performing the task may include a width dimension of the subject.

Alternatively or additionally to any of the embodiments above, the location of the hand of the subject performing the task may include a horizontal location of the hand of the subject and a vertical location of the hand of the subject.

Alternatively or additionally to any of the embodiments above, wherein: the one or more dimensions of the subject performing the task may include a width dimension of the subject, the location of the hand of the subject performing the task may include a horizontal location of a hand of the subject and a vertical location of the hand of the subject, and the controller is configured to use the following equation to determine the trunk angle of the subject performing the task:

$$T = a + b*f(H) + c*f(V) + d*f(w),$$

where: a, b, c, and d are constants, H is a value of the horizontal location of the hand of the subject performing the task, V is a value of the vertical location of the hand of the performing the task, w is a value of the width dimension of the subject performing the task, and T is a value of a trunk angle of the subject performing the task.

Alternatively or additionally to any of the embodiments above, wherein the data related to the subject performing the task may include video data and the controller may be configured to determine the one or more dimensions of the subject performing the task using pixel information from the video data.

Alternatively or additionally to any of the embodiments above, the controller may be configured to automatically determine one or both of the trunk angle of the subject performing the task and the one or more values of trunk kinematics of the subject performing the task in real time during playback of the video data.

Alternatively or additionally to any of the embodiments above, the controller may be configured to: identify a ghost effect in the video data, the ghost effect having a location in a frame of the video data; and determine the location of the hand of the subject performing the task based on the location of the ghost effect.

Alternatively or additionally to any of the embodiments above, wherein the trunk angle may be one of a trunk flexion angle and a spine flexion angle.

Another illustrative instances of the disclosure may include a computer readable medium having stored thereon in a non-transitory state a program code for use by a computing device, the program code causing the computing device to execute a method for determining one or both of a trunk angle of a subject and trunk kinematics of the subject. The method may include obtaining data related to the subject performing a task, determining a value for each of one or more dimensions of the subject performing the task based on the data, determining a location of a hand of the subject performing the task based on the data, and determining one or both of the trunk angle of the subject performing the task and one or more values of trunk kinematics of the subject performing the task based on the value for at least one dimension of the one or more dimensions of the subject performing the task and the location of the hand of the subject performing the task.

Alternatively or additionally to any of the embodiments above, determining one or more values of trunk kinematics of the subject performing the task may include determining a velocity of movement of a trunk of the subject performing the task.

Alternatively or additionally to any of the embodiments above, determining one or more values of trunk kinematics of the subject performing the task may include determining an acceleration of movement of a trunk of the subject performing the task.

Alternatively or additionally to any of the embodiments above, the one or more dimensions of the subject performing the task may include one or more of a height dimension of the subject and a width dimension of the subject.

Alternatively or additionally to any of the embodiments above, the location of the hand of the subject performing the task may include a horizontal location of the hand of the subject and a vertical location of the hand of the subject.

In another illustrative instance of the disclosure, a tracking system may include a processor and memory in communication with the processor. The memory may include instructions executable by the processor to: analyze pixel information in a video of a subject performing a task, determine a value for each of one or more dimensions of the subject in a frame from the video based on the pixel information, and determine a trunk angle of the subject in the frame based on the value for at least one dimension of the one or more dimensions of the subject in the frame.

Alternatively or additionally to any of the embodiments above, the memory may include further instructions executable by the processor to automatically determine trunk angles of the subject in real time during playback of the video.

Alternatively or additionally to any of the embodiments above, the memory may include further instructions executable by the processor to determine one or both of a velocity of movement of a trunk of the subject over a plurality of frames from the video and an acceleration of movement of the trunk of the subject over a plurality of frames from the video.

Alternatively or additionally to any of the embodiments above, the one or more dimensions of the subject in the frame may include one or more of a height dimension of the subject and a width dimension of the subject.

Alternatively or additionally to any of the embodiments above, memory may include further instructions executable by the processor to: identify a ghost effect in the frame, the ghost effect having a location in the frame, determine a location of a hand of the subject in the frame based on the location of the ghost effect, determine extreme-most pixels in a width dimension of the subject in the frame, assign a distance between the extreme-most pixels as a value of the width dimension, and determine the trunk angle of the subject in the frame based on the value of the width dimension of the subject in the frame and the location of the hand of the subject in the frame.

The above summary of some example embodiments is not intended to describe each disclosed embodiment or every implementation of the disclosure.

BRIEF DESCRIPTION OF THE DRAWINGS

The disclosure may be more completely understood in consideration of the following detailed description of various embodiments in connection with the accompanying drawings, in which:

FIG. 17 is a schematic flow diagram of an illustrative method of performing a risk assessment.

Figure 1:
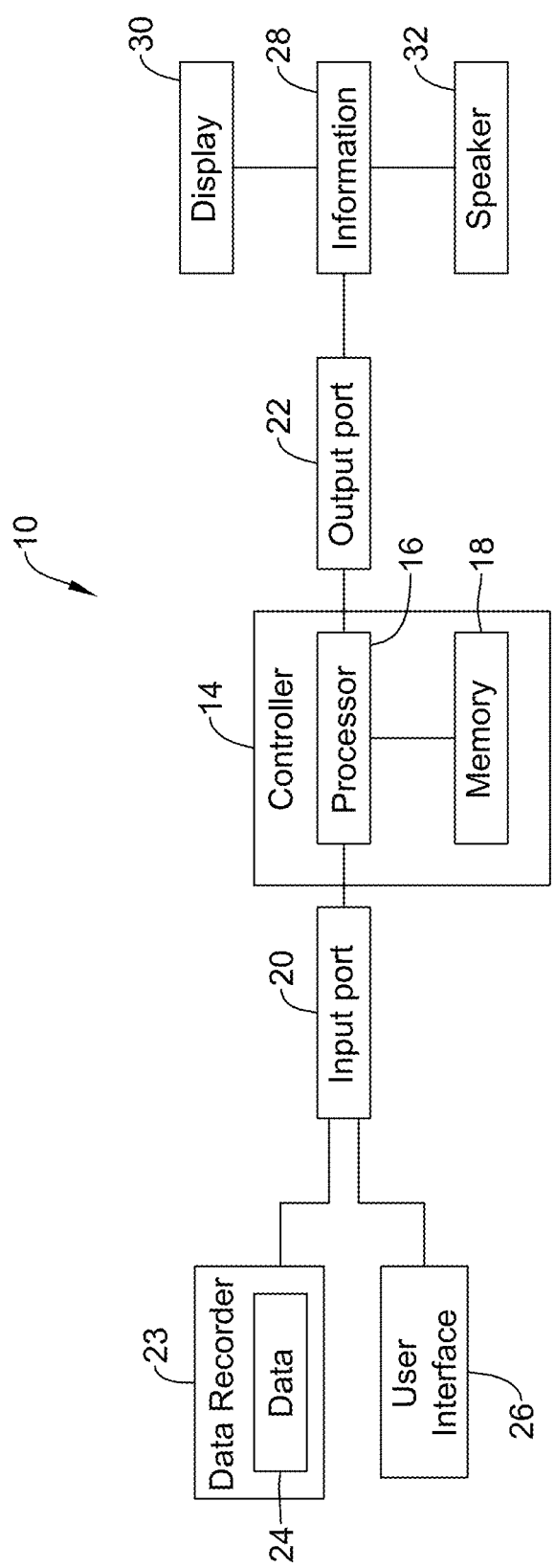
FIG. 1 is a schematic box diagram of an illustrative monitoring or tracking system.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Physical exertion is a part of many jobs. For example, manufacturing and industrial jobs may require workers to perform manual lifting tasks (e.g., an event of interest or predetermined task). In some cases, these manual lifting tasks may be repeated throughout the day. Assessing the worker's movements and/or exertions while performing tasks required by manufacturing and/or industrial jobs and/or movements of workers in other jobs or activities may facilitate reducing injuries by identifying movement that may put a worker at risk for injury.

Repetitive work (e.g., manual work or other work) may be associated with muscle fatigue, back strain, injury, and/or other pain as a result of stress and/or strain on a person's body. As such, repetitive work (e.g., lifting, etc.) has been studied extensively. For example, studies have analyzed what is a proper posture that reduces physical injury risk to a minimum while performing certain tasks and have also analyzed how movement cycles (e.g., work cycles) and associated parameters (e.g., a load, a horizontal location of the origin and destination of the motion (e.g., a lift motion or other motion), a vertical location of the origin and destination of the motion, a distance of the motion, a frequency of the motion, a duration of the movement, a twisting angle during the motion, a coupling with an object, etc.) relate to injury risk. Additional parameters associated with movement cycles that may contribute to injury risk may include the velocity and acceleration of movement of the subject (e.g., velocity and/or acceleration of trunk movement and/or other suitable velocity and/or acceleration of movement), the angle of a body of the subject (e.g., a trunk angle or other suitable angles of the body), and/or an object moved at an origin and/or destination of movement. Some of these parameters may be used to identify a person's risk for an injury during a task based on guidelines such as the National Institute for Occupational Safety and Health (NIOSH) lifting equation or the American Conference of Governmental Industrial Hygienists (ACGIH) Threshold Limit Value (TLV) for manual lifting, among others. Additionally, some of these parameters have been shown to be indicative of injury risk (e.g., risk of lower back pain (LBP) or lower back disorders (LBD), etc.), but are not typically utilized in identifying a person's risk for an injury during a task due to it being difficult to obtain consistent and accurate measurements of the parameters.

In order to control effects of repetitive work on the body, quantification of parameters such as posture assumed by the body while performing a task, the origin and/or destination of objects lifted during a task, duration of the task, position assumed during the task, a trunk angle assumed by the body while performing a task, kinematics of the body during the task, and frequency of the task, among other parameters, may facilitate evaluating an injury risk for a worker performing the task. A limitation, however, of identifying postures, trunk angles, trunk angle kinematics, the origin and destination of movement or moved objects, and/or analyzing movement cycles is that it can be difficult to extract parameter measurements from an observed scene during a task.

In some cases, wearable equipment may be used to obtain and/or record values of parameters in an observed scene during a task. Although the wearable equipment may provide accurate sensor data, such wearable equipment may require a considerable set-up process, may be cumbersome, and may impede the wearer's movements and/or load the wearer's body, and as a result, may affect performance of the wearer such that the observed movements are not natural movements made by the wearer when performing the observed task. Furthermore, it is difficult to identify an actual context of signals obtained from wearable instruments alone.

An example of commonly used wearable equipment is a lumbar motion monitor (LMM), which may be used to obtained and/or record values of parameters relating to movement of a subject performing a task. The LMM is an exoskeleton of the spine that may be attached to the shoulder and hips of a subject using a harness. Based on this configuration, the LMM may provide reliable measurements of a position, velocity, and acceleration of the subject's trunk while the subject is performing a task. However, similar to other wearable equipment, the LMM may be costly, require a considerable set-up/training process, may impose interruptions to the wearer's regular tasks, etc. The burdens of wearing the LMM and lack of other options for accurately measuring a trunk angle and/or trunk kinematics of a subject performing a task has led to safety organizations omitting trunk angle and/or trunk kinematics from injury risk assessments despite trunk angle and trunk kinematics being associated with work-related low-back disorders.

Observing a scene without directly affecting movement of the person performing the task may be accomplished by recording the person's movements using video. In some cases, complex 3D video equipment and measurement sensors may be used to capture video of a person performing a task.

Recorded video (e.g., image data of the recorded video) may be processed in one or more manners to identify and/or extract parameters from the recorded scene. Some approaches for processing the image data may include recognizing a body of the observed person and each limb associated with the body in the image data. Once the body and limbs are recognized, motion parameters of the observed person may be analyzed. Identifying and tracking the body and the limbs of an observed person, however, may be difficult and may require complex algorithms and classification schemes. Such difficulties in identifying the body and limbs extending therefrom stem from the various shaped bodies and limbs may take and a limited number of distinguishable features for representing the body and limbs as the observed person changes configurations (e.g., postures) while performing a task.

Video (e.g., image data recorded with virtually any digital camera) of a subject performing a task may be analyzed with an approach that does not require complex classification systems, which results in an approach that uses less computing power and takes less time for analyses than the more complex and/or cumbersome approaches discussed above. In some cases, this approach may be, or may be embodied in, a marker-less tracking system. In one example, the marker-less tracking system may identify a contour, or a portion of a contour, of a subject (e.g., a body of interest, a person, an animal, a machine and/or other subject) and determine parameter measurements from the subject in one or more frames of the video (e.g., a width dimension and/or a height dimension of the subject, a location of hands and/or feet of a subject, a distance between hands and feet of the subject, when the subject is beginning and/or ending a task, and/or other parameter values). In some cases, a bounding box (described in greater detail below) may be placed around the subject and the dimension of the bounding box may be used for determining one or more parameter values and/or position assessment values relative to the subject.

The data obtained from the above noted approaches or techniques for observing and analyzing movement of a subject and/or other suitable data related to a subject may be utilized for analyzing positions and/or movements of the subject and providing position and/or risk assessment information of the subject using lifting guidelines, including, but not limited to, the NIOSH Lifting Equation and the ACGIH TLV for manual lifting. The NIOSH Lifting Equation is described in greater detail in Waters, Thomas R. et al., "Revised NIOSH equation for the design and evaluation of manual lifting tasks", ERGONOMICS, volume 36, No. 7, pages 749-776 (1993), which is hereby incorporated by reference in its entirety. Although the NIOSH and ACGIH equations are discussed herein, other equations and/or analyses may be performed when doing a risk assessment of movement based on observed data of a subject performing a task and/or otherwise moving including relating analyses that assess injury risks based on values of a subject's trunk angle and/or trunk kinematics.

This disclosure discloses approaches for analyzing data related to a subject performing a task. The data related to a subject performing a task may be obtained through one of the above noted task observation approaches or techniques and/or through one or more other suitable approaches or techniques. As such, although the data analyzing approaches or techniques described herein may be primarily described with respect to and/or in conjunction with data obtained from a marker-less tracking system, the data analyzing approaches or techniques described herein may be utilized to analyze data obtained with other subject observation approaches or techniques.

Turning to the Figures, FIG. 1 depicts a schematic box diagram of a monitoring or tracking system 10 (e.g., a marker-less subject tracking system). The tracking system 10, as depicted in FIG. 1, may include a controller 14 having a processor 16 (e.g., a microprocessor, microcontroller, or other processor) and memory 18. In some cases, the controller 14 may include a timer (not shown). The timer may be integral to the processor 16 or may be provided as a separate component.

The tracking system 10 may include an input port 20 and an output port 22 configured to communicate with one or more components of or in communication with the controller 14 and/or with one or more remote devices over a network (e.g., a single network or two or more networks). The input port 20 may be configured to receive inputs such as data 24 (e.g., digital data and/or other data from a data capturing device and/or manually obtained and/or inputted data) from a data recorder 23 (e.g., an image capturing device, a sensor system, a computing device receiving manual entry of data, and/or other suitable data recorder), signals from a user interface 26 (e.g., a display, keypad, touch screen, mouse, stylus, microphone, and/or other user interface device), communication signals, and/or other suitable inputs. The output port 22 may be configured to output information 28 (e.g., alerts, alarms, analysis of processed video, and/or other information), control signals, and/or communication signals to a display 30 (a light, LCD, LED, touch screen, and/or other display), a speaker 32, and/or other suitable electrical devices.

In some cases, the display 30 and/or the speaker 32, when included, may be components of the user interface 26, but this is not required, and the display 30 and/or the speaker 32 may be, or may be part of, a device or component separate from the user interface 26. Further, the user interface 26, the display 30, and/or the speaker 32 may be part of the data recording device or system 23 configured to record data 24 related to a subject performing a task, but this is not required.

The input port 20 and/or the output port 22 may be configured to receive and/or send information and/or communication signals using one or more protocols. For example, the input port 20 and/or the output port 22 may communicate with other devices or components using a wired connection, ZigBee, Bluetooth, WiFi, IrDA, dedicated short range communication (DSRC), Near-Field Communications (NFC), EnOcean, and/or any other suitable common or proprietary wired or wireless protocol, as desired.

In some cases, the data recorder 23 may be configured to record data related to a subject performing a task and may provide the data 24. The data recorder 23 may include or may be separate from the user interface 26, the display 30, and/or the speaker 32. One or more of the data recorder 23, the user interface 26, the display 30, the speaker 32 and/or other suitable components may be part of the tracking system 10 or separate from the tracking systems 10. When one or more of the data recorder 23, the user interface 26, the display 30, and/or the speaker 32 are part of the tracking system 10, the features of the tracking system 10 may be in a single device (e.g., two or more of the data recorder 23, the controller 14, the user interface 26, the display 30, the speaker 32, and/or suitable components may all be in a single device) or may be in multiple devices (e.g., the data recorder 23 may be a component that is separate from the display 30, but this is not required). In some cases, the tracking system 10 may exist substantially entirely in a computer readable medium (e.g., memory 18, other memory, or other computer readable medium) having instructions (e.g., a control algorithm or other instructions) stored in a non-transitory state thereon that are executable by a processor (e.g., the processor 16 or other processor) to cause the processor to perform the instructions.

The memory 18 of the controller 14 may be in communication with the processor 16. The memory 18 may be used to store any desired information, such as the aforementioned tracking system 10 (e.g., a control algorithm), recorded data 24 (e.g., video and/or other suitable recorded data), parameters values (e.g., frequency, speed, acceleration, etc.) extracted from data, thresholds, equations for use in analyses (e.g., NIOSH Lifting Equation, ACGIH TLV for Manual Lifting, etc.), and the like. The memory 18 may be any suitable type of storage device including, but not limited to, RAM, ROM, EEPROM, flash memory, a hard drive, and/or the like. In some cases, the processor 16 may store information within the memory 18, and may subsequently retrieve the stored information from the memory 18.

As discussed with respect to FIG. 1, the monitoring or tracking system 10 may take on one or more of a variety of forms and the monitoring or tracking system 10 may include or may be located on one or more electronic devices. In some cases, the data recorder 23 used with or of the monitoring or tracking system 10 may process the data 24 thereon. Alternatively, or in addition, the data recorder 23 may send, via a wired connection or wireless connection, at least part of the recorded data or at least partially processed data to a computing device (e.g., a laptop, desktop computer, server, a smart phone, a tablet computer, and/or other computer device) included in or separate from the monitoring or tracking system 10 for processing.

Figure 2:
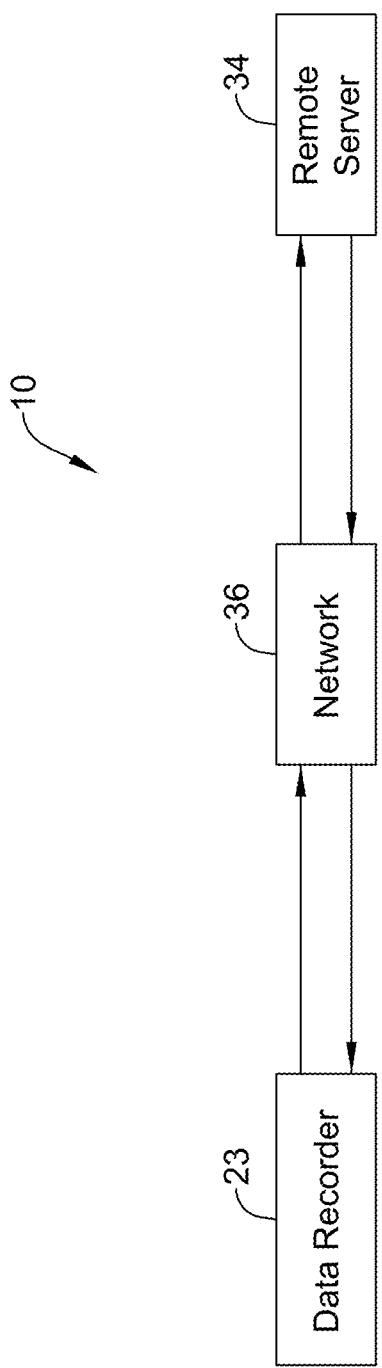
FIG. 2 is a schematic box diagram depicting an illustrative flow of data in a monitoring system.

FIG. 2 depicts a schematic box diagram of the monitoring or tracking system 10 having the data recorder 23 connected to a remote server 34 (e.g., a computing device such as a web server or other server) through a network 36. When so configured, the data recorder 23 may send recorded data to the remote server 34 over the network 36 for processing. Alternatively, or in addition, the data recorder 23 and/or an intermediary device (not necessarily shown) between the data recorder 23 and the remote server 34 may process a portion of the data and send the partially processed data to the remote server 34 for further processing and/or analyses. The remote server 34 may process the data and send the processed data and/or results of the processing of the data (e.g., a risk assessment, a recommended weight limit (RWL), a lifting index (LI), etc.) back to the data recorder 23, send the results to other electronic devices, save the results, and/or perform one or more other actions.

The remote server 34 may be any suitable computing device configured to process and/or analyze data and communicate with a remote device (e.g., the data recorder 23 or other remote device). In some cases, the remote server 34 may have more processing power than the data recorder 23 and thus, may be more suitable for analyzing the data recorded by the data recorder 23, but this is not always the case.

The network 36 may include a single network or multiple networks to facilitate communication among devices connected to the network 36. For example, the network 36 may include a wired network, a wireless local area network (LAN), a wide area network (WAN) (e.g., the Internet), and/or one or more other networks. In some cases, to communicate on the wireless LAN, the output port 22 may include a wireless access point and/or a network host device and in other cases, the output port 22 may communicate with a wireless access point and/or a network access point that is separate from the output port 22 and/or the data recorder 23. Further, the wireless LAN may include a local domain name server (DNS), but this is not required for all embodiments. In some cases, the wireless LAN may be an ad hoc wireless network, but this is not required.

Figure 3:
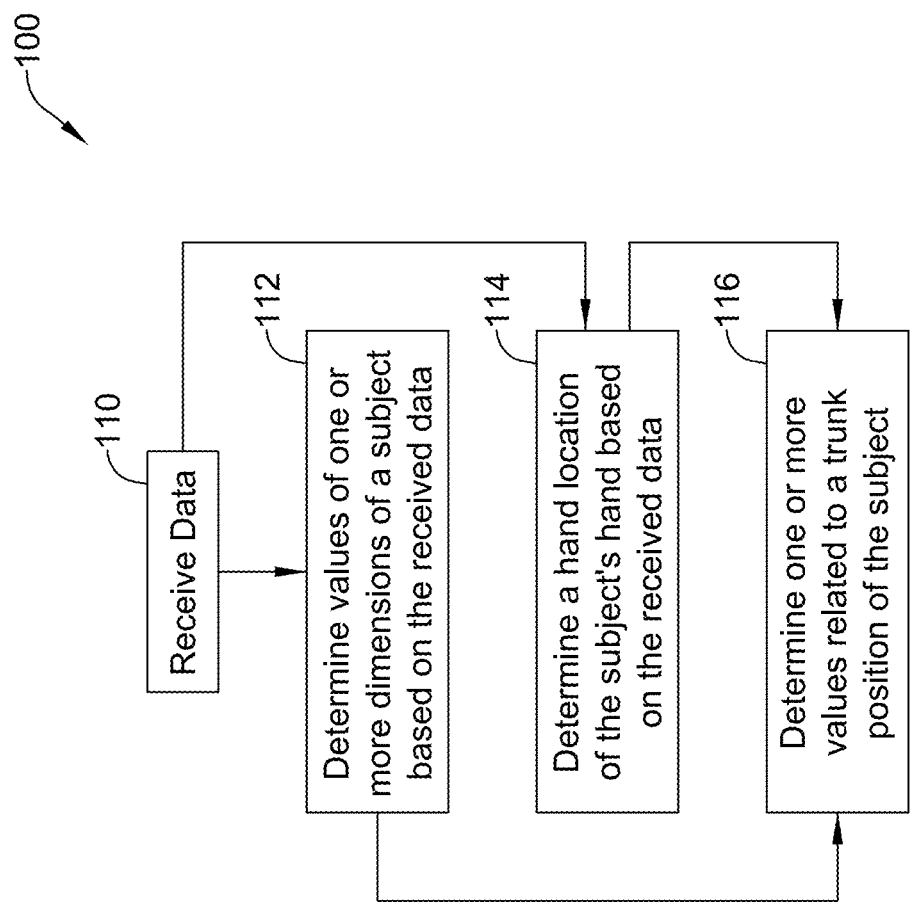
FIG. 3 is a schematic flow diagram of an illustrative method of monitoring movement of a subject.

FIG. 3 depicts a schematic overview of an approach 100 for identifying, analyzing, and/or tracking movement of a subject based on received data. The approach 100 may be implemented using the tracking system 10, where instructions to perform the elements of approach 100 may be stored in the memory 18 and executed by the processor 16. Additionally or alternatively, other suitable monitoring and/or tracking systems may be utilized to implement the approach 100.

The approach 100 may include receiving 110 data (e.g., the data 24 and/or other suitable data) from a data source (e.g., the data recorder 23 and/or other suitable source). Based on the received data, values of one or more parameters related to a subject performing a task may be determined. For example, based on the received data, values of one or more dimensions of a subject (e.g., while the subject performs a task and/or at other suitable times) may be determined 112, one or more values indicative of a hand location of one or more hands of the subject (e.g., while the subject performs the task and/or at other suitable times) may be determined 114, and/or one or more other suitable values of parameters related to the subject performing the task may be determined. Based on values of the one or more dimensions of the subject and/or values indicative of the hand location of the subject (e.g., the determined values of the one or more parameters of the subject performing a task), one or more values (e.g., location values, angle values, movement values, and/or other suitable values) related to a trunk position of the subject may be determined 116.

After determining values of one or more dimensions of the subject and determining values indicative of a location of the hands of the subject, parameters values, in addition to or as an alternative to parameter values related to a trunk position of the subject, may be extracted from the received data to determine a position of the subject (e.g., a lifting state or other state of the subject). In some cases, analyses of the values related to a trunk position of the subject, a position of the subject, and/or other parameter values may include using the obtained parameter values in the NIOSH Lifting Equation, the ACGIH TLVs for Manual Lifting, equations evaluating risk of lower back pain (LBP), and/or other movement analyses equations to evaluate risk of injury to the subject while performing a task recorded in the received data, but the obtained parameter values may be analyzed for one or more other purposes.

The received data may be obtained or received 110 from any suitable data recording component, device, or system. In some cases, the data may be received from a data recorder including, but not limited to, an image capturing device (as discussed in greater detail below), wearable equipment, manual measurements, sensors (e.g., photo sensors, infrared sensors, etc.), three-dimensional video equipment, and/or other suitable devices configured to monitor and/or record data related to a subject moving or performing a task.

The received data may be any suitable type of data. For example, the data may be digital data, analog data, video data, sensor data, manually entered data, and/or other suitable types of data.

Values of parameters may be extracted from the received data. In one example, values of one or more dimensions (e.g., a height, a width, etc.) of a subject may be determined 112 based on the received data in any suitable manner. In some cases, the received data may directly indicate values of the one or more dimensions of the subject, may indicate values of dimensions of a feature related to one or more dimensions of the subject, indicate values related to sensor readings associated with the subject, and/or indicate other suitable values related to one or more dimensions of the subject. In one example, values for measurements of two or more sensors located on the subject at known locations may be extracted from the data and a difference between the values may be indicative of one or more dimensions of the subject. In another example, values for dimensions of a shape applied around the subject may be extracted from the data and the one or more dimensions of the subject may be a function of the dimensions of the shape (e.g., a width or height of a shape applied around a subject may be indicative of a width or height of the subject). In a further example, values of extreme-most points (e.g., extreme-most pixels when the data is video data) of the subject in one or more dimensions of the subject may be extracted from the data and differences between extreme-most points of the subject in a dimension may be indicative of a value of the dimension of the subject. Examples of extracting one or more dimensions of the subject from received data based on shapes applied to the subject and extreme-most points of the subject are discussed below in greater detail.

The one or more dimensions of the subject may be any suitable type of dimension of the subject. For example, the one or more dimensions of the subject may be a height dimension of the subject, a width dimension of the subject, and/or other suitable dimension of the subject.

In another example of extracting values of parameters from the received data, values related to or indicative of a hand location may be determined 114 based on the received data in any suitable manner. In some cases, the hands of the subject may be initialized, recognized, and/or tracked manually. Alternatively or additionally, the hands of the subject may be initialized, recognized, and/or tracked by software (e.g., in an automated manner) that analyzes the received data. In one example, the received data may provide values for measurements measured by one or more sensors that may be associated with the hands of the subject and the value indicative of the location of the hands may be determined based on the values for the measurements. In a further example, one or more "ghost effects" in the data (e.g., video data) that are indicative of an object being lifted or lowered by the subject (e.g., hence, also indicative of a location of the hands of the subject) may be identified and a location of the hands may be determined based on a location of the ghost effects. An example of determining values indicative of a hand location of the subject is discussed below in greater detail and, although not necessarily required, may include estimating a center of the ghost effect indicative of the object being lifted or lowered by the subject.

Any suitable values indicative of a location of one or more hands of the subject may be determined. In some cases, a value for a vertical location of one or more hands of the subject and a value for a horizontal location of one or more hands of the subject may be determined. In some cases, as discussed in greater detail below, a value of a horizontal location of one or more hands of the subject may be a distance between a feet location of the subject and the hand location of the subject in a horizontal direction/dimension and a value of a vertical location of one or more hands of the subject may be a distance between the feet location of the subject and the hand location of the subject in a vertical direction/dimension. Alternatively or additionally, a value of a horizontal location and/or a vertical location of one or more hands of the subject may include horizontal and vertical pixel locations, respectively, on a pixel grid.

Values of, indicative of, or otherwise related to a trunk position of the subject may be determined 116 in any suitable manner based on the received data. In one example, the values related to or indicative of a trunk position of the subject may be determined based on one or more values of one or more dimensions of the subject and/or a value of a hand location of the subject.

Figure 4:
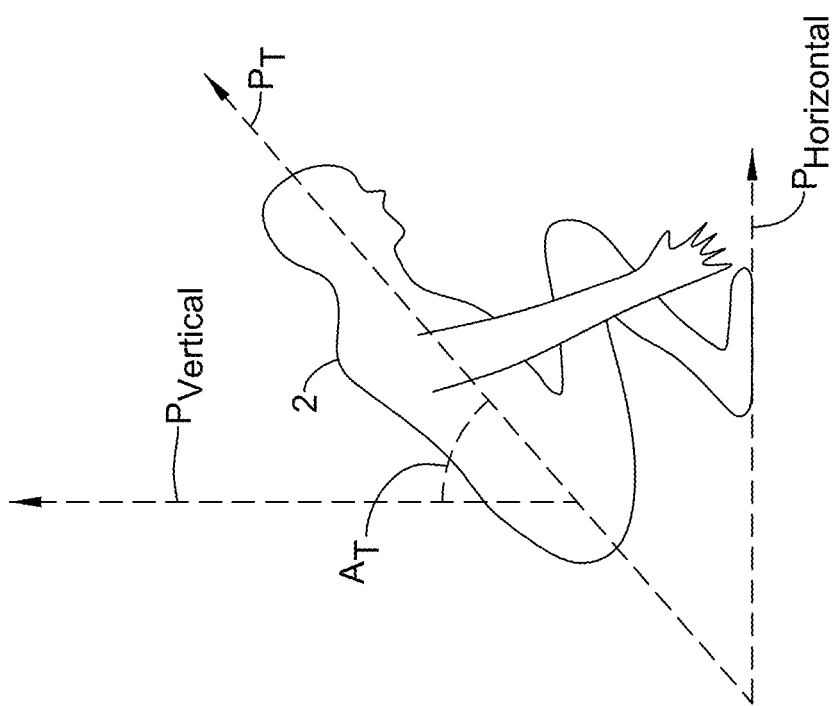
FIG. 4 depicts a subject and an illustrative trunk angle of the subject.

Example values of trunk positions of the subject that may be determined based on values of one or more dimensions of the subject and/or values indicative of a hand location of the subject include, but are not limited to, a trunk angle of the subject, a velocity of movement of the trunk of the subject, an acceleration of movement of the trunk of the subject, and/or other suitable positional values related to the trunk of the subject. FIG. 4 depicts a subject 2 having a trunk angle, $A_T$. The trunk angle, $A_T$ may be defined by an imaginary line or plane, $P_T$, extending through a spine of the subject 2 if the spine of the subject 2 were straight and a line or plane, $P_{vertical}$, perpendicular to a line or plane, $P_{horizontal}$, of or parallel to a surface supporting the subject 2. When determining a trunk angle and/or trunk kinematics, a distinction may be made between a trunk flexion angle, a spine flexion angle, and/or other suitable trunk angles. A trunk flexion angle may be the trunk angle, $A_T$, as depicted in FIG. 4, where the subject 2 is bending forward and the line or plane, $P_T$, that extends through a spine of the subject 2 also extends through a hip of the subject 2. A spine flexion angle may be an angle of a line or plane that extends through a spine of a subject and the L5/S1 disc of the spine when the subject is bending forward at the L5/S1 disc.

Additionally or alternatively, values of one or more dimensions of the subject and/or values indicative of a hand location of the subject may be utilized to determine or estimate other suitable parameters related to the subject performing a task and/or the task including, but not limited to, a horizontal hand location of the subject relative to feet of the subject, a vertical hand location of the subject relative to the feet of the subject, a displacement of a bounding box upper-left corner, a displacement of a bounding box upper-right corner, a ratio of a height of a bounding box to a width of the bounding box, an angle between a bounding box diagonal and a bottom of the bounding box, a length of a bounding box diagonal, an angle between a line segment between hands and feet of the subject and the floor, a length of a line segment between hands and feet of the subject, a posture of the subject, a velocity of movement of the subject, an acceleration of movement of the subject, and/or values of one or more other suitable parameters of the subject that may assist in assessing injury risk to a subject performing a task.

Example suitable parameters that may be determined or estimated from values of one or more dimensions of the subject and/or the hand location of the subject include, but are not limited to, those depicted in and described with respect to Table 1:

TABLE 1

| Parameters | Description | Equation |
| --- | --- | --- |
| H | Hand horizontal location relative to feet | Lifting monitor algorithm |
| V | Hand vertical location relative to feet | Lifting monitor algorithm |
| BH | Bounding box height | Lifting monitor algorithm |
| BW | Bounding box width | Lifting monitor algorithm |
| DUL | Displacement of bounding box upper-left corner | Lifting monitor algorithm |
| DUR | Displacement of bounding box upper-right corner | Lifting monitor algorithm |
| R | Ratio of BH to BW | $R = \dfrac{BH}{BW}$ |
| DA | Angle between bounding box diagonal and the bottom | $DA = \arctan\dfrac{BH}{BW}$ |

TABLE 1-continued

| Parameters | Description | Equation |
|---|---|---|
| DL | Bounding box diagonal length | $DL = \sqrt{BH^2 + BW^2}$ |
| HDA | Angle between the line segment between hands and feet and the floor | $HDA = \arctan\frac{H}{W}$ |
| HDL | Length of the line segment between hands and feet | $HDL = \sqrt{H^2 + V^2}$ |

Figure 5:
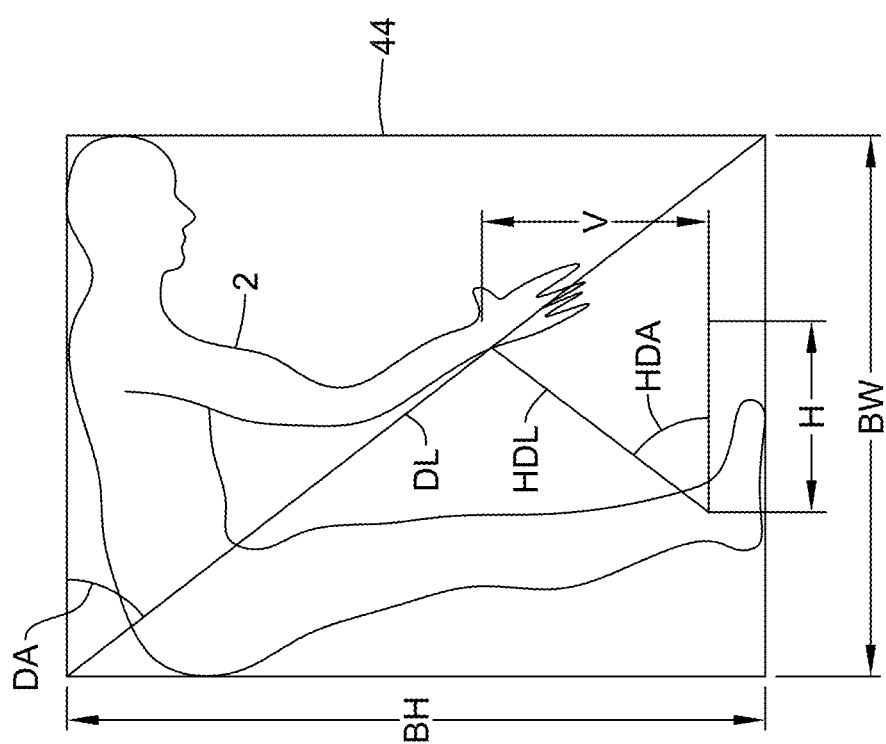
FIG. 5 depicts a subject and illustrative parameters related to the subject.

FIG. 5 depicts the subject 2 within a bounding box 44, to provide a visual description of the BH, BW, DA, DL, HAD, and HDL. Illustrative lifting monitor algorithms used to determine some of the parameters of Table 1 are described below, for example, with respect to FIGS. 6-17. Further, Table 1 and an illustrative lifting monitor algorithm used to determine some of the parameters in Table 1 are described in Greene R. L., Lu M. L., Barim M. S., Wang X, Hayden M., Hu Y. H., Radwin R. G., *Estimating Trunk Angle Kinematics During Lifting Using a Computationally Efficient Computer Vision Method. Hum Factors,* 2020 Sep. 24:18720820958840. doi: 10.1177/0018720820958840. Epub ahead of print. PMiD: 32972247, which is incorporated herein by reference in their entirety. Additionally or alternatively, suitable parameters other than those depicted in Table 1 may be determined or estimated from values of one or more dimensions of the subject and/or the hand location of the subject are contemplated.

Generally, a trunk angle of the subject may be determined or estimated from one or more of a value of a height measurement (h) of a subject (e.g., estimated by a height of a bounding box, BH, applied around the subject and/or determine in one or more other suitable manners), a value of a width measurement (w) of a subject (e.g., estimated by a width of a bounding box, BW, applied around the subject and/or determine in one or more other suitable manners), a ratio of the value of the height measurement (h) to the value of the width measurement (w) at, a value of a hand vertical location (V) of the subject, a value of a hand horizontal location (H) of the subject, a value of a ratio of a hand vertical location (V) to the value of the hand horizontal location (H) of the subject, and/or values of one or more other suitable parameters related to the subject and/or task being performed.

Values related to a trunk position (e.g., trunk angle, trunk kinematics, etc.) of the subject may be determined 116 from data received by fitting one or more equations to the data. Illustrative techniques for measuring and/or determining trunk kinematics (trunk angle, trunk velocity, and trunk acceleration) are described herein and in Greene et al., *Estimating Trunk Angle Kinematics During Lifting Using a Computationally Efficient Computer Vision Method,* (2020), which was incorporated by reference above.

In some cases, a trunk angle (e.g., a trunk flexion angle, a spine flexion angle, and/or suitable trunk angle) of the subject may be determined using the following general equation:

$$T = a + b*f(H) + c*f(V) + d*f(w) + e*f(h) + f*f(H/V) + g*f(h/w) \quad (1)$$

where a, b, c, d, e, f, and g are constants and T is the trunk angle of the subject. In some cases, one or more constants a, b, c, d, e, f, and g may be equal to zero, but this is not required. For example, it may be found that the following equation provides an accurate estimate of a trunk angle:

$$T = a + b*f(H) + c*f(V) + d*f(w) \quad (2)$$

where the constants e, f, and g in equation (1) are all equal to zero.

One example application of equation (1) for determining or estimating trunk angles (e.g., a trunk flexion angle) of a subject may be:

$$T = 76.42 - 2.14*\ln(H) - 1.12*(\ln(H))^2 - 7.97*\ln(V) - 1.32*(\ln(V))^2 + 0.16*BW \quad (3).$$

A further example application of equation (1) for determining or estimating trunk angles (e.g., a spine flexion angle) of a subject may be:

$$T = 85.63 - 2.12*(\ln(H))2 - 5.34*\ln(V) - 0.62*(\ln(V))2 + 0.58*BW \quad (4)$$

Such example applications of equation (1) and/or other suitable applications of equation (1) may be selected independent of values of or states of one or more parameters of the subject performing the task. Other suitable applications of equation (1) are contemplated.

In some cases, an application of equation (1) may be selected based on a value of one or more parameters of the subject performing the task. For example, a state and/or value of one or more parameters of the subject performing the task at time, t, may be determined and then, based on the determined state and/or value of the one or more parameters, an application of equation (1) may be selected to determine a trunk angle value or other trunk position value of the subject at the time, t.

In some cases, the one or more parameters of the subject performing the task may be or may include a posture of the subject, where the states of the posture may be determined and an application of equation (1) or other suitable equations may be selected based on the determined state of the posture. In some cases, the states of the posture of the subject performing the task may include, but are not limited to, a standing posture, a stooping posture, and a squatting posture. The posture state of the subject may be determined using video data analysis techniques described in greater detail below, video data analysis techniques other than those described herein, analyses of non-video data related to posture states of the subject, and/or other suitable analyses of data related to the subject performing a task. Alternatively or in addition, a manually entered posture state may be utilized. In one example of determining a trunk angle of a subject performing a task based on a posture state of the subject, an application of equation (1) when the subject is determined to be in a standing state may be:

$$T = -55.40*V^2 - 71.07*(h/w) + 66.89 \quad (5);$$

an application of equation (1) when the subject is determined to be in a stooping state may be:

$$T = -55.40*V^2 - 71.07*(h/w) + 66.89 \quad (6);$$

an application of equation (1) when the subject is determined to be in a squatting state may be:

$$T = -48.67*H + 26.18*H^2 - 150.31*V - 51.27*V^2 + 64.10*w + 73 \quad (7).$$

Other suitable applications of equation (1) based on postures states of the subject and/or based on other states and/or values of other suitable parameters of the subject may be utilized.

As discussed above, values of trunk position parameters of a subject may be determined 116 from the received data in addition to values of a trunk angle. For example, values of trunk kinematics including, but not limited to, values of a trunk velocity of the subject (e.g., a value of a velocity of movement of a trunk of the subject performing a task), values of a trunk acceleration of the subject (e.g., a value of an acceleration of movement of a trunk of the subject performing a task), and/or values of other suitable trunk-related parameters of the subject may be determined from received data. In one example, a trunk velocity may be determined by taking an absolute value of a difference between a trunk position at a first time determined from an application of equation (1) and a trunk position at a second time determined from an application of equation (1) and then, dividing by an absolute value of a difference between the first time and the second time (e.g., a difference in time, frames, relative times of frames, etc.). Similarly, a trunk acceleration may be determined by taking an absolute value of a difference between a trunk velocity at a first time and a trunk velocity at a second time and then, dividing by an absolute value of a difference between the first time and the second time.

In another example of fitting one or more equations to the data to determine a value related to a trunk position, an exponential equation may be fitted to the received data. In some cases, linear or nonlinear regression or other suitable analyses may be used to determine the fitted equation. Fitting an equation, such as an exponential equation, to trunk angles (e.g., trunk angles during a lift) may facilitate estimating trunk angles over a series of consecutive video frames (e.g., dynamically), along with calculating trunk kinematics (e.g., trunk speed/velocity, acceleration, etc.) over a series of video frames.

Illustratively, such an exponential equation may take the following general form:

$$T = \alpha \cdot e^{\beta x} \quad (8)$$

where T, is a trunk angle of a subject during a lift of an object at a frame number, x, of a series of frames (e.g., a series of consecutive or non-consecutive frames) depicting a subject lifting the object and $\alpha, \beta$ are coefficients determined based on the received and/or calculated data (e.g., H, V, BH, BW, R, etc.) related to the subject lifting the object. The variables for determining or predicting the coefficients, $\alpha, \beta$, of the exponential equation may include, but are not limited to, the average, maximum, and standard deviations for features in the received and/or calculated data, along with the respective speed and acceleration over the set of frames depicting the subject performing the lift. In some cases, the coefficients, $\alpha, \beta$, may differ based on a posture or positioning of the subject (e.g., whether the subject is stooping, squatting, or standing), but this is not required.

In one example, one or more illustrative exponential equations modeling a trunk angle over multiple frames depicting a lift by the subject may be determined from values of and/or derived from H, V, BH, BW, and R (e.g., as described in Table 1 above) over 20 frames of a subject performing a lift. In some cases, the one or more illustrative exponential equations may be determined for stoop lifts, squat lifts, and standing lifts. Although other techniques may be utilized, regression models may be used to determine or predict coefficients $\alpha, \beta$ of equation (8) for stoop lifts, squat lifts, and standing lifts. A summary of the regression models used to determine or predict coefficients $\alpha, \beta$ of equation (8) for stoop lifts, squat lifts, and standing lifts is provided in Table 5:

TABLE 5

| Variables | | Estimates | CI | p |
|---|---|---|---|---|
| Coefficient ($\alpha$) | | | | |
| stoop | (Intercept) | 2.37 | −1.48-6.22 | 0.222 |
| | SD DA speed | 14.79 | 3.45-26.14 | 0.012* |
| | Mean DL acceleration | −0.07 | −0.18-0.04 | 0.198 |
| | SD DL speed | 0.07 | −0.03-0.16 | 0.161 |
| | Mean HDA speed | −4.71 | −8.43--0.99 | 0.014* |
| | Mean DA acceleration | −0.91 | −1.78--0.05 | 0.039* |
| | Max DA acceleration | −0.13 | −0.22--0.04 | 0.004** |
| | SD DL acceleration | 0 | 0.00-0.00 | <0.001*** |
| | Mean HDA acceleration | −0.33 | −0.69-0.03 | 0.069 |
| | SD HDA acceleration | 0.04 | −0.02-0.10 | 0.148 |
| | Mean HDL acceleration | −0.01 | −0.01-0.00 | 0.1 |
| | DUR | −0.02 | −0.05-0.01 | 0.143 |
| squat | (Intercept) | 13.54 | 4.39-22.69 | 0.01** |
| | SD DA acceleration | −0.24 | −0.53-0.05 | 0.088 |
| | Mean DL acceleration | 0.02 | 0.00-0.04 | 0.048* |
| | SD DL acceleration | 0 | −0.00-0.00 | 0.066 |
| | Max HDA acceleration | −0.1 | −0.19--0.00 | 0.046* |
| | SD HDL acceleration | 0.2 | −0.06-0.47 | 0.111 |
| stand | (Intercept) | 1.37 | −2.80-5.54 | 0.514 |
| | Mean DL speed | 0.06 | −0.00-0.12 | 0.062 |
| | Max HDA speed | 0.06 | 0.03-0.10 | <0.001*** |
| | SD HDA speed | −7.42 | −15.51-0.66 | 0.071 |
| | Mean HDA speed | 0.17 | −0.05-0.38 | 0.137 |
| | SD HDA speed | −0.31 | −0.52--0.10 | 0.004** |
| | Mean DA acceleration | 1.11 | −0.26-2.48 | 0.109 |
| | Mean DL acceleration | 0.01 | 0.00-0.02 | 0.016* |
| | Max HDL acceleration | 0.09 | 0.01-0.16 | 0.021* |
| | DUL | −0.02 | −0.05-0.01 | 0.18 |
| Coefficient ($\beta$) | | | | |
| stoop | (Intercept) | 0.1 | 0.05-0.15 | <0.001*** |
| | Mean DA acceleration | $1.57e^{-2}$ | 0.00-0.03 | 0.034* |
| | Max DA acceleration | $2.26e^{-3}$ | 0.00-0.00 | 0.035* |
| | SD DA acceleration | $4.36e^{-3}$ | −0.01-0.00 | 0.082 |
| | Mean DL acceleration | $9.40e^{-5}$ | −0.00-0.00 | 0.063 |
| | SD DL acceleration | $-1.65e^{-5}$ | −0.00--0.00 | 0.025* |
| squat | (Intercept) | −0.02 | −0.11-0.06 | 0.544 |
| | Mean DA acceleration | $3.52e^{-2}$ | 0.01-0.06 | 0.012* |
| | Mean DL acceleration | $-2.94e^{-4}$ | −0.00--0.00 | 0.012* |
| | SD DL acceleration | $4.21e^{-5}$ | 0.00-0.00 | 0.009** |
| | Max HDA acceleration | $2.21e^{-3}$ | 0.00-0.00 | 0.002** |
| | SD HDA acceleration | $-5.34e^{-3}$ | −0.01--0.00 | 0.004** |
| stand | (Intercept) | $1.00e^{-1}$ | 0.05-0.15 | <0.001*** |

Note:
SD refers to standard deviation.
*p < .05.
**p < 0.01.
***p < .001.

The coefficient $\beta$ when the subject is performing a stand lift is a constant (0) due to utilizing a minimum flexion when performing a standing lift.

Trunk speed and/or acceleration of the trunk of the subject during the lift may be determined in any suitable manner. In one example, based on the determined trunk angles and a video frame rate of the frames of the subject performing the lift, trunk speed and acceleration in each frame may be calculated. Alternatively or additionally, the velocity and acceleration of trunk movement may be determined mathematically by taking derivatives of the fitted functions.

FIGS. 6-17 depict systems and approaches for identifying, analyzing, and/or tracking movement of a subject based on received data, where the data is video data and the system may implement an application of the approach 100. In some cases, the video data may be obtained in a non-intrusive manner (e.g., without the use of sensors). Other systems and approaches for identifying, analyzing, and/or tracking movement of a subject based on received data are contemplated.

Figure 6:
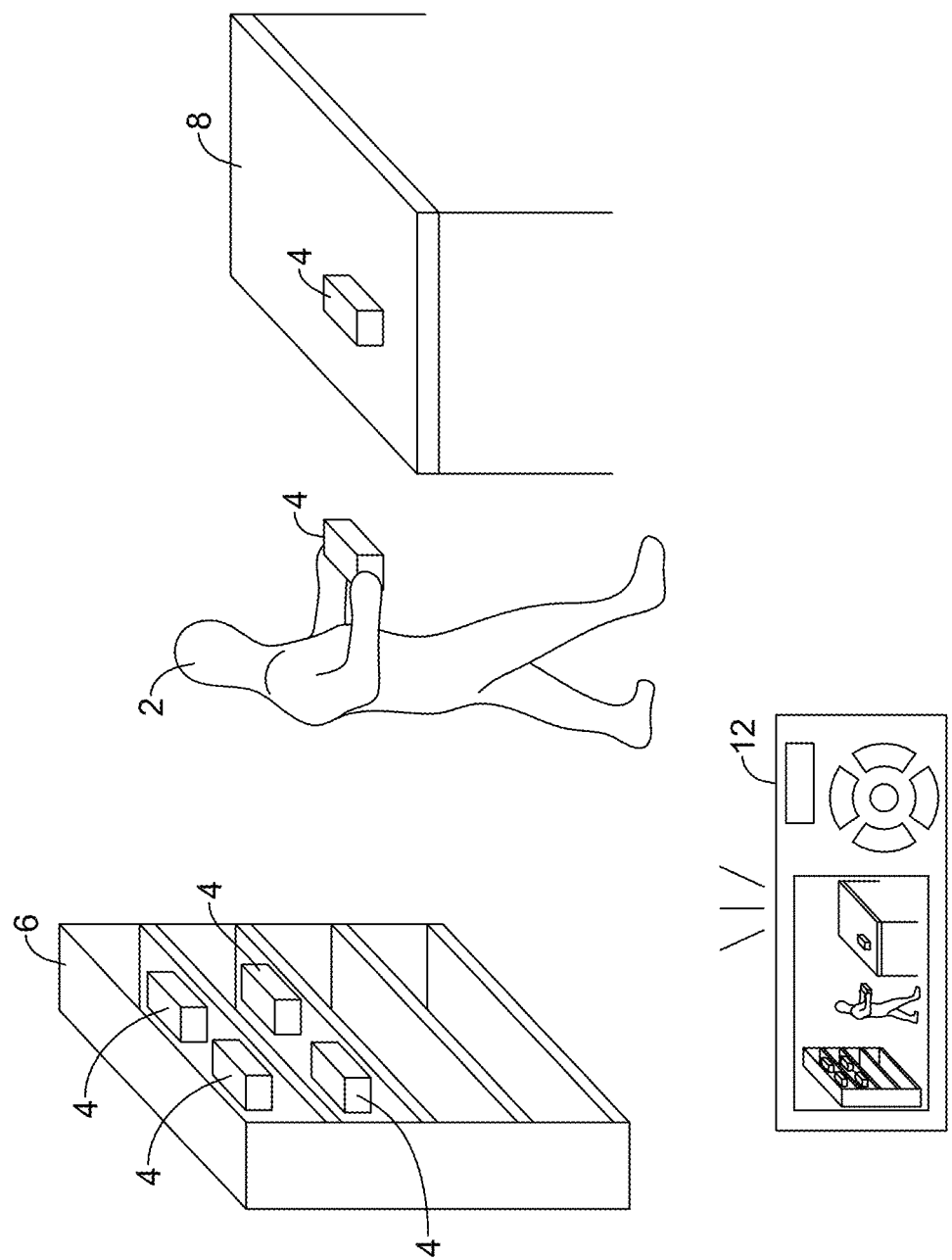
FIG. 6 is a schematic view of an illustrative monitoring system capturing images of a task being performed.

FIG. 6 is a schematic view of an image capturing device 12 (e.g., which may be an example of the data recorder 23 and/or other suitable data recorder) of, or used in conjunction with, a tracking and/or monitoring system (e.g., a tracking or monitoring or tracking system 10, as shown in FIG. 1), where the image capturing device 12 is set up to observe the subject 2 perform a task (e.g., moving objects 4 from a shelf 6 to a table 8, as shown in FIG. 6, or other task). The image capturing device 12 may be or may include one or more of a phone (e.g., a camera-equipped smart phone or other phone), a portable digital camera, a dedicated digital camera (e.g., a security camera or other dedicated camera), a digital camcorder, a tablet computer, a laptop, a desktop, and/or a suitable other electronic device capable of recording video.

Any suitable number of image capturing devices 12 may be utilized. In some cases, video of the subject 2 performing a task may be captured with two or more image capturing devices 12. Additionally or alternatively, although 2D data is primarily discussed herein as being captured by the image capturing device(s) 12, the image capturing device(s) 12 may be utilized to capture 3D image data of the subject 2 and such 3D image data may be utilized to analyze a task performed by the subject 2 in a manner similar to those described herein for captured 2D video data.

Figure 7:
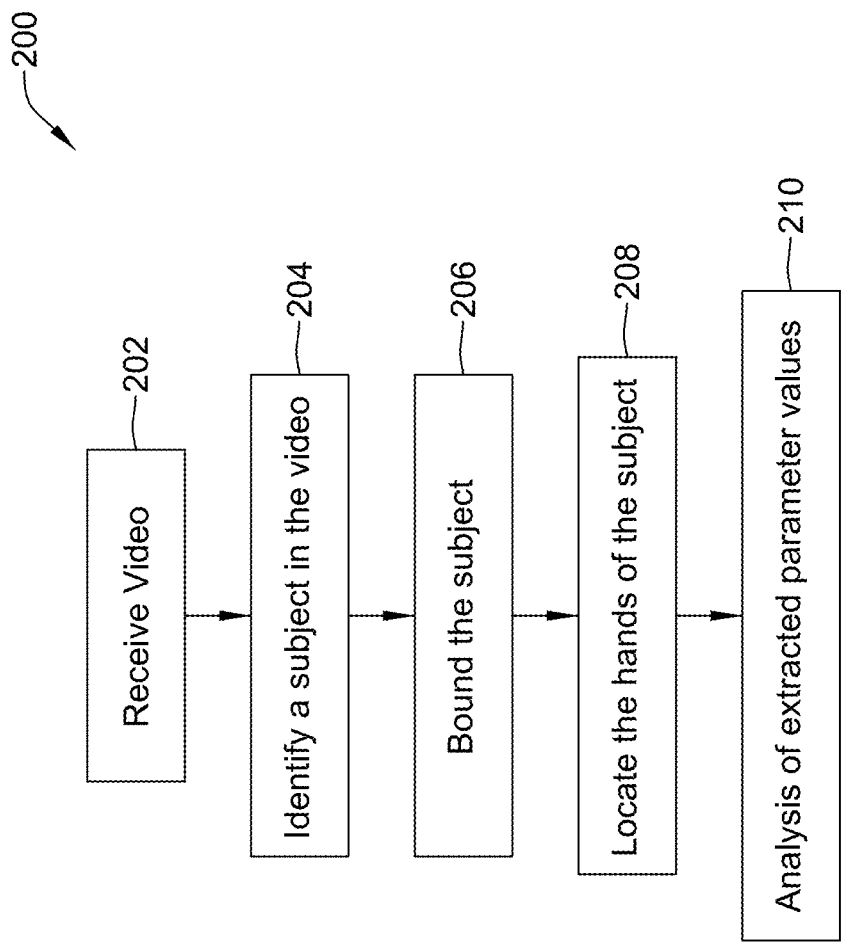
FIG. 7 is a schematic flow diagram of an illustrative method of monitoring movement of a subject.

FIG. 7 depicts a schematic overview of an approach 200 for identifying and analyzing movement of a subject (e.g., the subject 2 or other suitable subject) in video without the use of sensors or continuous tracking of limbs of a subject via linkage algorithms. In some cases, the approach 200 may be considered an application of the approach 100, but this is not required.

The approach 200 may include receiving 202 video from an image capturing source (e.g., the image capturing device 12 or other suitable data recorder) and identifying 204 the subject in the video. Once the subject is identified 204, the subject may be bound 206 and the hands of the subject may be located 208. After locating 208 the hands of the subject, parameters values extracted from the video based on the identified subject, the bound of the subject, the location of the hands of the subject, and/or other parameters may be analyzed 210 to determine a position of the subject (e.g., a lifting state, a posture state, kinematics, a trunk angle, trunk kinematics, and/or other state or position of the subject). In some cases, the analyses may include using the obtained parameter values in the NIOSH Lifting Equation, the ACGIH TLVs for Manual Lifting, an equation determining injury risk (e.g., lower back disorder injury risk and/or other suitable injury risks) based on a trunk position of the subject, and/or other movement analysis equations to evaluate risk of injury to the subject while performing a task recorded in the video, but the obtained parameter values may be analyzed for one or more other purposes.

Identifying 204 the subject in received video may be accomplished in one or more manners. For example, the subject may be identified 204 in received video by manually identifying the subject and/or by identifying the subject in an automated or at least partially automated manner (e.g., automatically and/or in response to a manual initiation). A subject may be manually identified by manually outlining the subject, by applying a shape (e.g., a box or other shape) around the subject, by clicking on the subject, and/or manually identifying the subject in one or more other manners. Background subtraction or other suitable techniques may be utilized to automatically identify or identify in an automated manner a contour of the subject (e.g., a foreground). Other suitable manual techniques and/or automated techniques may be utilized to identify a subject in received video.

Background subtraction may be performed in one or more manners. In general, background subtraction may be performed by statistically estimating whether a pixel in the current frame of video (e.g., each pixel or a set of pixels in the current frame) belongs to the background or the foreground depicted in the frame. To facilitate statistically estimating whether a pixel belongs to the background or the foreground depicted in a frame, each pixel or set of pixels may be given a value based on a feature (e.g., color, shading, intensity, etc.) of the pixel. Here, an underlying assumption is that values of a background pixel in a video will change slowly over time (e.g., background pixels may be expected to remain unchanged for at least a plurality of consecutive frames of video) compared to values of a foreground pixel (e.g., foreground pixels, especially those on or around a periphery of a subject, may be expected to change from frame-to-frame in video and/or at least more rapidly than background pixels). As a result, values of a pixel over a fixed window of a past set of frames can be used to estimate the pixel value at the current frame (e.g., in some cases, the estimated pixel value may be considered an expected pixel value). If the prediction is sufficiently accurate with respect to an actual pixel value at the current frame, this pixel is likely to be and/or may be considered to be a background pixel. Otherwise, this pixel is likely to be and/or may be considered to be a foreground pixel. Alternatively or in addition, an estimated pixel value may be indicative of a foreground pixel and if the prediction is sufficiently accurate with respect to an actual pixel value at the current frame, the pixel is likely to be and/or may be considered to be a foreground pixel. Otherwise, the pixel is likely to be and/or may be considered to be a background pixel.

As used herein, a pixel may be a smallest addressable element in an image or display device. Each pixel used to depict a frame of video may have an address or physical coordinates in a two-dimensional grid in the frame.

One may model the values of a pixel over a fixed number of past video frames using a Mixture of Gaussian (MOG) model and update the model parameters adaptively as the algorithm progresses over time to provide estimates of pixel values and determine if a pixel belongs to the background or the foreground. An example MOG approach is described in Zivkovic, Zoran. "Improved adaptive Gaussian mixture model for background subtraction." Pattern Recognition, 2004, ICPR 2004, Proceedings of the 17th International Conference on. Vol. 2. IEEE, 2004, which is hereby incorporated by reference in its entirety. Another example MOG approach is described in Zivkovic, Zoran, and Ferdinand Van Der Heijden. "Efficient adaptive density estimation per image pixel for the task of background subtraction." Pattern recognition letters 27.7 (2006): 773-780, which is hereby incorporated by reference in its entirety. Additionally, or alternatively, other modeling techniques and/or segmentation approaches may be utilized to differentiate between a background and a foreground.

Figure 8A:
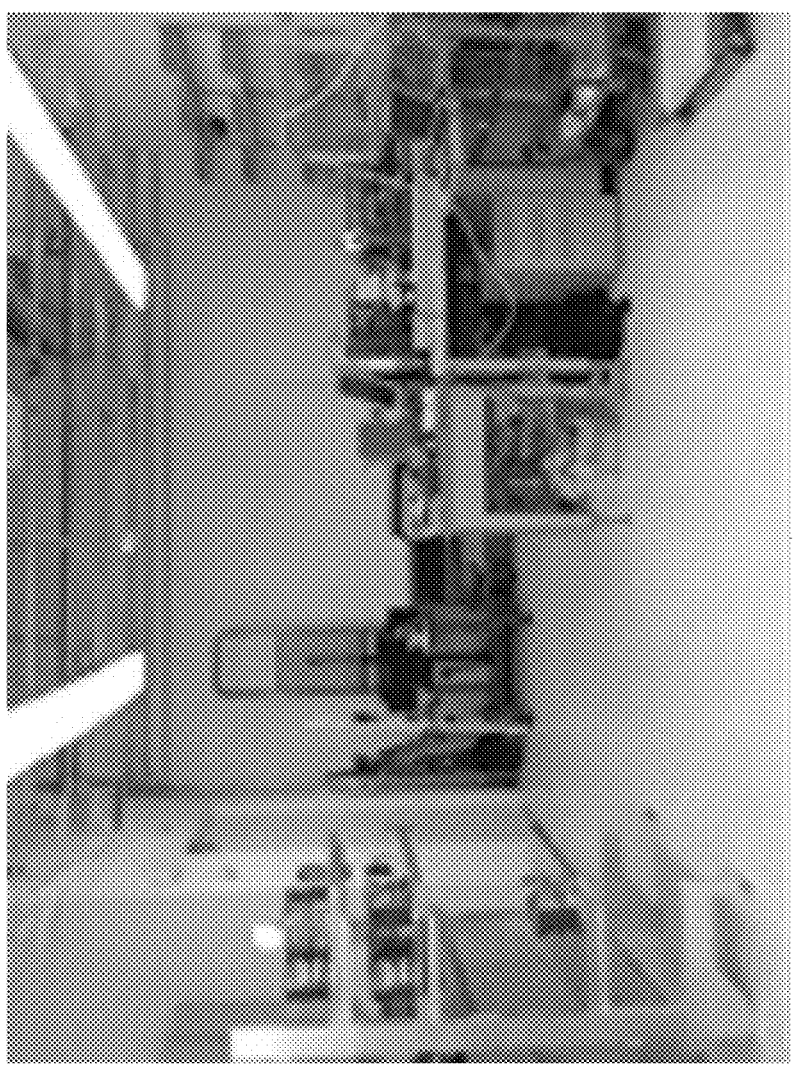
FIG. 8A is an illustrative frame of video used as a reference frame in a monitoring system.
Figure 8B:
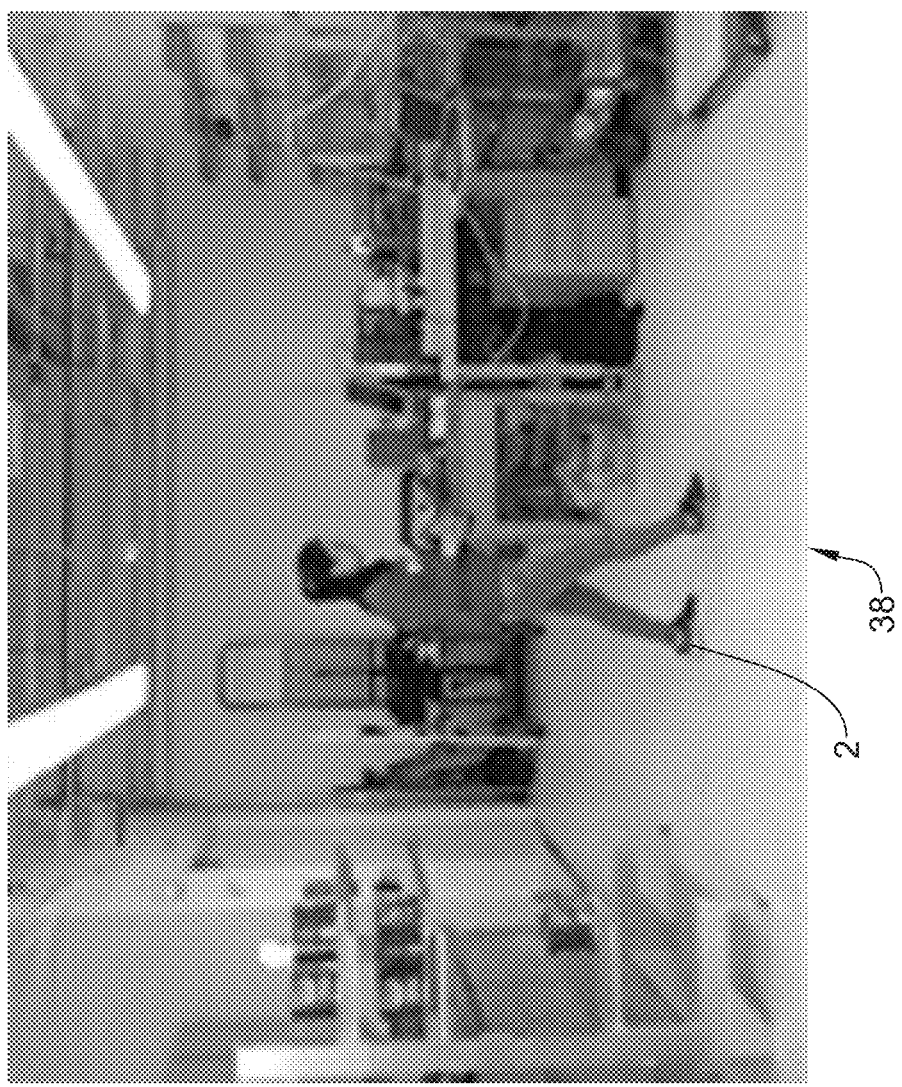
FIG. 8B is an illustrative frame of video that may be compared to the reference frame in FIG. 8A by the monitoring system.

FIGS. 8A and 8B depict frames of a video. In FIG. 8A, a frame having a background 38 is depicted without a subject 2. FIG. 8B depicts a frame having the subject 2 with the background 38 of or substantially similar to the background 38 in FIG. 8A. One of the frame in FIG. 8A and the frame in FIG. 8B may be considered a reference frame and pixels of the other frame may be compared to corresponding possible pixel values from a distribution developed based on at least the reference frame and each pixel in the other frame may be assigned an indicator of being background or foreground (e.g., a number value, a color (e.g., black or white), etc.) using the segmentation approaches discussed above.

Figure 9:
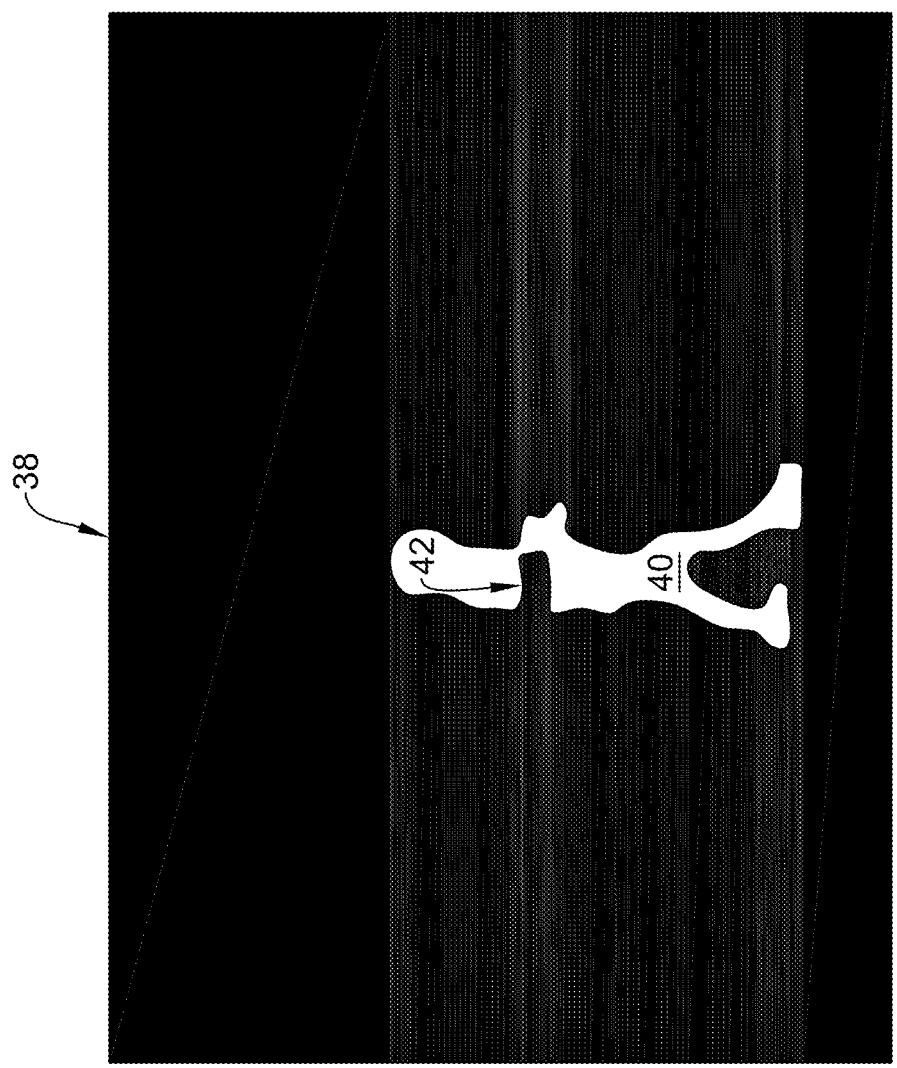
FIG. 9 is a schematic view of an illustrative segmented frame of video depicting a result from comparing the frame of video in FIG. 8B with the reference frame of FIG. 8A.

FIG. 9 depicts a foreground subtraction resulting from segmenting FIG. 8B relative to FIG. 8A. As this may be the beginning of the video, the background may change and the possible background pixel value Gaussian distribution mixture model (e.g., the MOG model or other model) may be of only one distribution component with a mean value of the distribution being the same as the pixel values in FIG. 8A. The appearance of the moving subject in FIG. 7B may not be matched into the corresponding background model and as a result, the pixels of the moving subject may be considered the foreground (e.g., as represented in white as a silhouette 40) and the rest of the pixels may be considered the background (e.g., as represented in black). Although the segmentation is depicted in FIG. 9 with the background being black and the foreground being white, other colors or techniques (e.g., outlining, etc.) may be used to distinguish between a foreground and a background. Alternatively, segmentation may not be depicted and a display may depict the original video during and/or after processing of the video or no video at all.

Although the background in the frames of FIG. 8A and FIG. 8B is static or substantially static, the background subtraction techniques described above may be utilized on dynamically changing backgrounds. In such cases and/or in other suitable instances, an initialization of the subject 2 may be done to distinguish the moving subject 2 from other moving objects in the background. Such initialization may be accomplished by manually or automatically applying a bounding box (e.g., as discussed below) to or around the subject and/or may be accomplished in one or more other manners. After the initialization of the subject 2, any objects identified as moving (e.g., through identifying a ghost effect blob) between frames may be compared to the initialized subject 2 in a previous frame and only moving objects matching the initialized subject 2 in the previous frame will be kept as foreground or as the subject 2.

In some cases, the monitoring or tracking system 10 may not be able to recognize an entirety of the subject 2, which may result in an incomplete silhouette 40 of the subject 2 (e.g., the silhouette may have one or more holes or gaps 42, as shown in FIG. 9) being produced from comparing pixels of successive frames of video. Such holes or gaps 42 may appear due to noise in the environment (e.g., illumination changes, shadows, etc.) around the background 38 and/or due to a pixel representing part of the subject 2 (e.g., one or more pixels in the frame) that may have an appearance (e.g., intensity value) that is close to that of a pixel of the background 38 in a reference frame, such that the pixel value matches the background model. It is contemplated that the holes or gaps 42 may occur in a silhouette for one or more other reasons.

The holes or gaps 42 in a silhouette 40 may be addressed in one or more manners. In one example, the holes or gaps 42 may be filed through morphological and/or other techniques that fill-in gaps between identified portions of the silhouette 40.

Once the subject 2 has been identified in the video by identifying the silhouette 40 and/or by one or more other suitable technique, the subject 2 may be bound 206, as depicted in the illustrative approach 200 of FIG. 7. The subject 2 may be bound 206 using one or more manual and/or automated techniques.

In one example of bounding the subject 2, marginal pixels of the silhouette 40 of the subject 2 in a horizontal direction and in a vertical direction may be identified. That is, an extreme-most pixel of the silhouette 40 in a positive y-direction, an extreme-most pixel of the silhouette 40 in the negative y-direction, an extreme-most pixel of the silhouette 40 in a positive x-direction, and an extreme-most pixel of the silhouette 40 in a negative x-direction may be identified relative to a center of the silhouette 40. A height dimension of the silhouette 40 may be identified by taking a difference of a vertical coordinate location on the grid of the frame for the extreme-most pixel of the silhouette 40 in the positive y-direction and a vertical coordinate location on the grid of the frame for the extreme-most pixel of the silhouette 40 in the negative y-direction. A width dimension of the silhouette 40 may be identified by taking a difference of a horizontal coordinate location on the grid of the frame for the extreme-most pixel of the silhouette 40 in the positive x-direction and a horizontal coordinate location on the grid of the frame for the extreme-most pixel of the silhouette 40 in the negative x-direction. The height dimension and the width dimension of the silhouette 40 may be used as or assigned as a height dimension and width dimension, respectively, of the subject 2.

Figure 10:
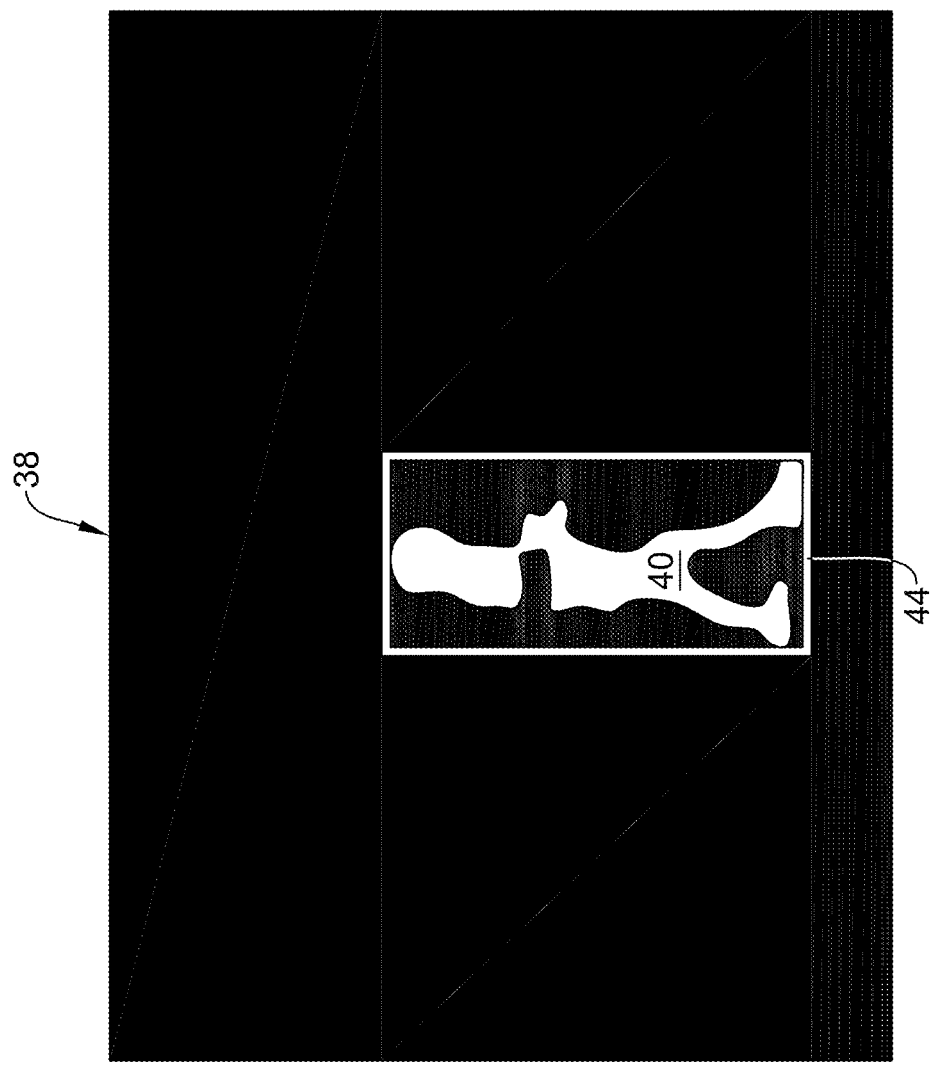
FIG. 10 is a schematic view of an illustrative segmented frame of video with a bounding box applied around an identified subject.

Alternatively, or in addition, the subject 2 may be bound 206 by applying a bounding box 44 around silhouette 40, as shown in FIG. 10. The bounding box 44 may be applied close around the silhouette 40. In some cases, an edge of the bounding box 44 may tangentially pass each of the marginal pixels of the silhouette 40 in a positive y-direction, a negative y-direction, a positive x-direction, and a negative x-direction relative to a center of the silhouette 40. Alternatively or in addition, the bounding box 44 may be applied around the silhouette 40 to bound the subject 2 so as to extend through one or more other pixels of the silhouette 40 and/or the background 38. The height and width dimensions of the bounding box 44 may be equal to or may be indicative of a height dimension and width dimension of the silhouette 40. Similar to as discussed above, the height dimension and/or the width dimension of the bounding box 44 may be used as or assigned as a height dimension and a width dimension, respectively, of the subject 2. Further, in some cases, the height and width dimensions of the bounding box 44 may be indicative of an object 4 location, a hand location of the subject 2, a posture state of the subject 2, a trunk angle of the subject 2, and/or other parameter values.

Figure 11A:
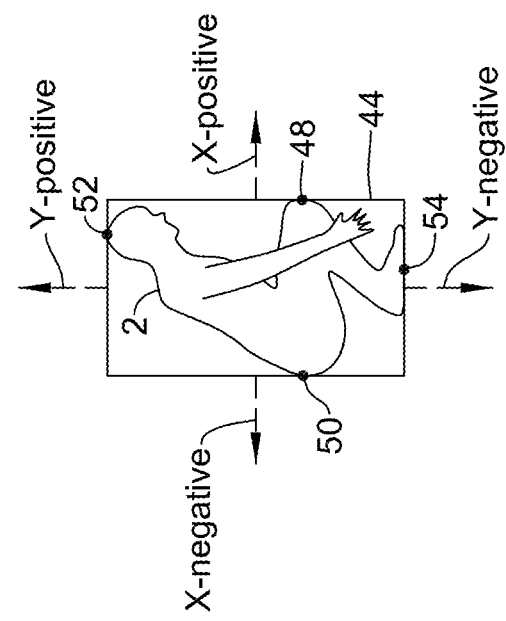
FIGS. 11A-11C depict subjects in different illustrative orientations, where the subjects are bound by a bounding box.
Figure 11B:
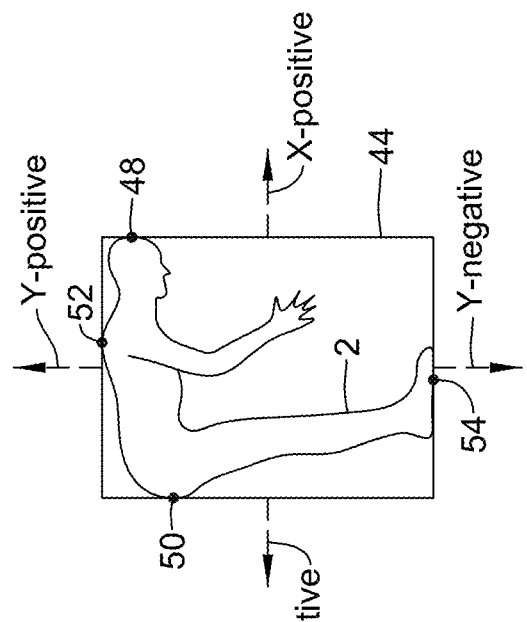
Figure 11C:
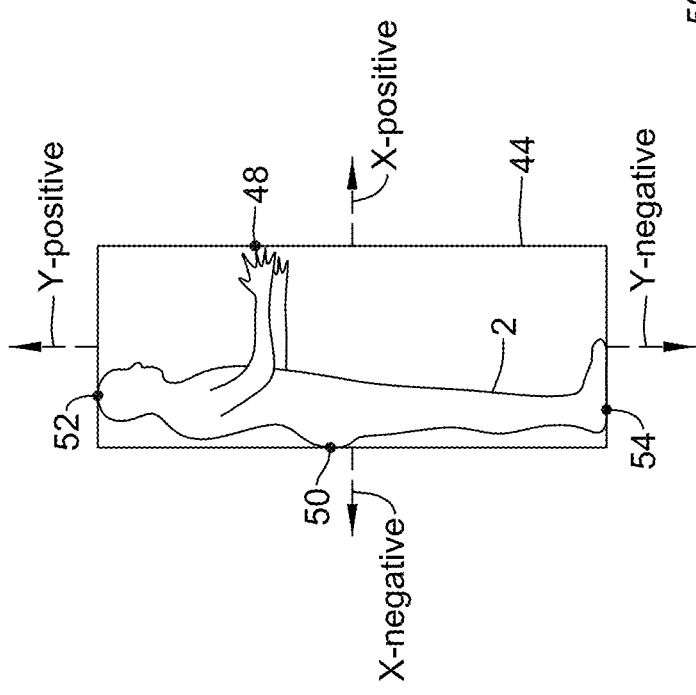

FIGS. 11A-11C depict the subject 2 in three different postures, respectively, with a bounding box 44 and identified locations of marginal pixels. In FIG. 11A, the subject 2 is in a standing position or posture, in FIG. 11B the subject 2 is in a stooping position or posture, and in FIG. 11C the subject 2 is in a squatting position or posture. Although other postures of the subject may be identified, a standing posture, a stooping posture, and a squatting posture (e.g., see FIGS. 11A-11C for depictions of these postures) may be a focus of posture analysis due to the relevance of these postures in the NIOSH lifting equation and/or the ACGIH TLV for manual lifting, among other analyses.

Each of FIG. 11A, FIG. 11B, and FIG. 11C depict a coordinate system 46 relative to a center of a height and width of the subject 2. The coordinate system 46 is depicted for descriptive (e.g., relational) purposes only and is not necessarily part of the monitoring or tracking system 10. Further, FIGS. 11A-11C depict a marginal pixel 48 in the x-positive direction, a marginal pixel 50 in the x-negative direction, a marginal pixel 52 in the y-positive direction, and a marginal pixel 54 in the y-negative direction. Then, optionally, the bounding box 44 may be applied around the subject 2 (or the silhouette 40 of the subject 2) tangential to or otherwise relative to the marginal pixels 48, 50, 52, 54.

As can be seen from FIGS. 11A-11C, each of the respective orientations or postures of the subject 2 correspond to a different height and width dimension of the subject 2 or bounding box 44. It has been found that a height and a width of a subject 2 or bounding box 44 correlates with an orientation (e.g., posture, trunk angle, or other orientation) of the subject 2 and/or other parameters relative to the subject 2. As such, in a lifting analysis, the height and width dimension of the subject 2 or the bounding box 44 may be utilized to determine or predict at least the orientation of the subject 2 and to determine injury risks for the subject without complex linkage algorithms, sensors and sensor data, and manual measurements (e.g., hip and/or knee angles, etc.). The orientation(s) of the subject and/or injury risks in view thereof may be determined in real time (e.g., in real time during recording of video and/or during playback of video), but this is not required.

In some cases, a posture of the subject may be determined from the subject's identified and/or assigned dimensions based on one or more of the dimensions of the bound in one or more suitable manners. In one example, the posture of the subject may be determined based on the subject's determined height dimension and the subject's determined width dimension, but other dimensions of the subject may be additionally and/or alternatively used.

As referred to above, a technique for identifying standing, stopping, and squatting postures of a subject in frames of video that does not require tracking of bending angles of a subject in video, use of sensors, use of manual identification, or use of complex limb tracking algorithms may include determining these posture states based on one or both of the subject's height and width dimensions. In some cases, a value based on the height dimension of the subject and a value based on the width dimension of the subject (e.g., the height and width dimensions of the subject, normalized height and width dimensions of the subject, and/or other values based on the height and width dimensions of the subject) may be compared to one or more height thresholds and one or more width thresholds, respectively, to determine the subject's posture.

Figure 12:
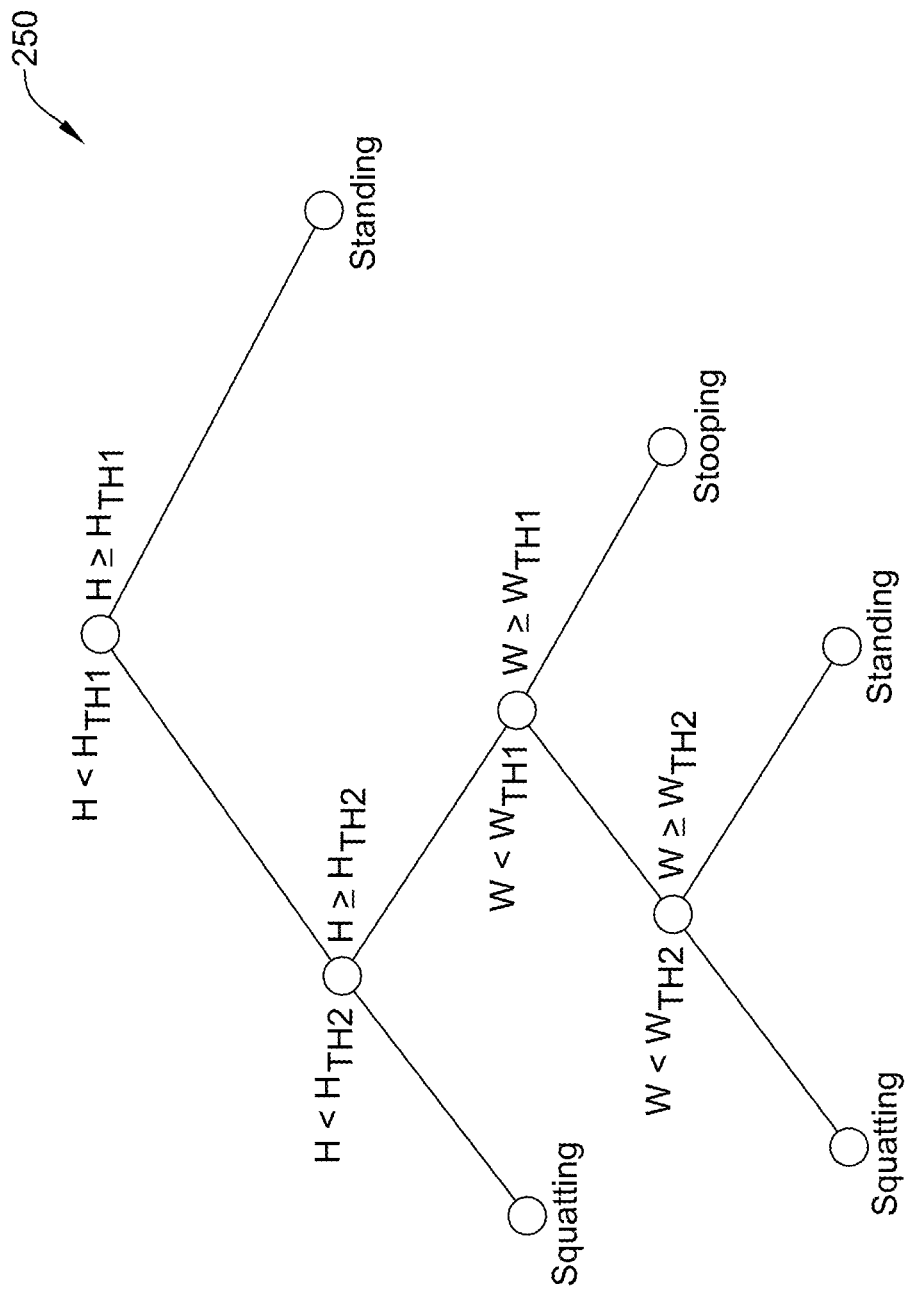
FIG. 12 is a schematic diagram of an illustrative decision tree technique for comparing values to thresholds.

When determining whether a subject in a frame of video is in a standing posture, a stooping posture, or a squatting posture, the value based on the height of the subject may be compared to a first height threshold and a second height threshold and the value based on a width of the subject may be compared to a first width threshold and a second width threshold. The values based on the dimensions of the subject may be compared to thresholds using one or more suitable techniques and in one or more suitable orders. In some cases, a technique using a decision tree 250, as shown in FIG. 12 for example, may be utilized. Additional or alternative techniques for comparing the values based on the dimensions of the subject to thresholds may include, but are not limited to, look up tables, algebraic equations, and/or other suitable techniques.

In an example using a decision tree, such as when the decision tree 250 is utilized, an analysis may start at a top of the decision tree 250 and initially the value based on the height of the subject may be compared to the first height threshold $H_{TH1}$. When the value based on the height of the subject has reached or gone beyond (e.g., is equal to or greater than) the first height threshold $H_{TH1}$, the subject may be classified as being in and/or may be assigned a standing posture. When the value based on the height of the subject has not reached or gone beyond the first height threshold $H_{TH1}$, then the value based on the height of the subject may be compared to the second height threshold $H_{TH2}$. When the value based on the height of the subject has not reached or gone beyond (e.g., is less than) the second height threshold $H_{TH2}$, the subject may be classified as being in and/or may be assigned a squatting posture. When the value based on the height of the subject has not reached or gone beyond the first height threshold $H_{TH1}$ and has reached or gone beyond the second height threshold $H_{TH2}$, a value based on the width of the subject may be compared to the first width threshold $W_{TH1}$. When the value based on the width of the subject has reached or gone beyond the first width threshold $W_{TH1}$, the subject may be classified as being in and/or may be assigned a stooping posture. When the value based on the height of the subject has not reached or gone beyond the first height threshold $H_{TH1}$ and has reached or gone beyond the second height threshold $H_{TH2}$ and the value based on the width of the subject to has not reached or gone beyond the first width threshold $W_{TH1}$, the value based on the width of the subject may be compared to the second width threshold $W_{TH2}$. When the value based on the width of the subject has reached or gone beyond the second width threshold $W_{TH2}$, the subject may be classified as being in and/or may be assigned a standing position. When the value based on the width of the subject has not reached or gone beyond the second width threshold $W_{TH2}$, the subject may be classified as being in and/or may be assigned a squatting position. Using a decision tree technique for comparing values based dimensions to dimension threshold values may result in an efficient determination of posture information for a monitored subject.

Values of the threshold values related to height and width of the subject may be suitable values related to a type of value that is used for the values based on the height and width dimensions of the subject. For example, when the values based on the height and width dimensions are normalized using a normalizer of a standing height of a subject in the example above, the first height threshold $H_{TH1}$ may be a value in a range from about 0.90 to about 0.95, the second height threshold $H_{TH2}$ may be a value in a range from about 0.63 to about 0.68, the first width threshold $W_{TH1}$ may be a value in a range from about 0.64 to about 0.69, and the second width threshold $W_{TH2}$ may be a value in a range from about 0.51 to about 0.57. In one example, the first height threshold $H_{TH1}$ may be a about 0.93, the second height threshold $H_{TH2}$ may be about 0.66, the first width threshold $W_{TH1}$ may be about 0.67, and the second width threshold $W_{TH2}$ may be about 0.54. Other values for thresholds used in determining a posture of a subject are contemplated.

In addition to or as an alternative to being able to extract posture information and/or other information from video to assess injury risk or for another purpose, it may be useful to be able to locate 208 the hands of the subject, as presented in the approach 200 of FIG. 7. Hand location may be determined in any suitable manner. In some cases, the hands of the subject may be initialized, recognized, and/or tracked manually or by software (e.g., in an automated manner)

A technique has been developed to identify the hands of the subject 2 during at least frames of when a task starts and frames of when a task ends. In some cases, such a technique may utilize identifying "ghost effects" when the subject 2 loads and/or unloads the object 4 and may not require training of a continuous hand detector and may be able avoid or mitigate error due to difficulties in differentiating hands from other portions of the subject 2. This technique of identifying hands or locations of hands of the subject 2 using ghost effects may be used in addition to or as an alternative to other suitable techniques for identifying hands of the subject, including, but not limited to, techniques utilizing manual identification of hands, techniques for continuous or semi-continuous (e.g., at specified intervals) tracking over time, techniques utilizing a continuous hand detector, and/or other suitable techniques for identifying hands or locations of hands of the subject 2.

A ghost effect may be a set of connected and/or adjacent points (e.g., a set of pixels in a frame of video data) detected as being in motion, but not corresponding to any real moving objects. Such a definition of "ghost effects" is discussed in Shoushtarian, B. and Bez, H. "A practical adaptive approach for dynamic background subtraction using an invariant colour model and object tracking." Pattern Recognition Letters, January 2005, 26(1):5-26, January 2005, which is hereby incorporated by reference in its entirety. For example, a ghost effect may be a cluster of pixels that represents an appearance of a static object or a region of a scene where these pixels look different in a current frame than in one or more immediately previous frames. The ghost effect may appear and then disappear into background after the background model learns and updates the new appearance of these pixels over a plurality of frames.

As such, in some cases, the ghost effects may be considered to be a by-product of the background subtraction technique discussed above and may be utilized to identify when a task begins and/or ends, along with a location of the hands of the subject when the task begins and/or ends. For example, as the background subtraction technique may update the background model (e.g., the Gaussian distribution background model, MOG) over two or more frames to adapt for backgrounds that are not static, it may take several frames for a moving object 4 to be considered background after the moving object 4 stops (e.g., becomes static) and/or is separated from the subject 2. Similarly for a static object 4 that starts to move, the location where the object 4 was may take several frames to be considered background. As a result of this delay in recognizing what is background and what is foreground, a location of a moving object 4 after it stops moving (e.g., an ending location) and/or a location of a static object 4 before it begins moving (e.g., a beginning location) may show up as a blob or ghost effect in a frame of video.

As discussed, one case in which a ghost effect may occur is when a static object is moved and values of pixels at the region where the object was static become different from estimated values of the pixel based on a background model for pixels at the region and thus, that region may be considered to be foreground and/or depicted as such in a frame. The background model may then take several (e.g., two or more) frames to learn the new static appearance of that region and absorb the pixels of that region into the background model. That is, before the background model updates, the pixels of the region where the object was static are labeled as foreground and are considered to depict a ghost effect.

As discussed, another case where a ghost effect might occur is when a moving object becomes static. A region where the object stops may change its appearance from a previous appearance when the object was not present (e.g., the background) into an appearance associated with a subject or moving object (e.g., the foreground). As the background model of the region is built up with only pixel values for the previous appearance for when the object was not present in the region, a new presence of the static object in the region may be considered to be foreground. The background model may then take several frames to learn the new static appearance of the region with the newly received object and absorb the pixels of that region into the background model. Before the background model updates, the pixels of the region where the object stopped moving may be labeled as foreground and/or may be considered a ghost effect.

Further and as discussed in greater detail below, the ghost effects 56, as shown for example in FIGS. 13A-13E, 14, and 15, may be detected, and a subject's hand location may be determined from the detected ghost effects 56, by looking for clusters of foreground pixels in a frame of video that were not present in a reference frame or frames of the video. In some cases, ghost effects 56 may be identified when clusters of pixels satisfy certain principles. The principles may include, among other principles, consistency in time (e.g., a cluster of pixels show up in the same location in the following N frames), gradual vanishing (e.g., a size of a cluster should be no larger than a size of the object and may gradually become smaller over a set of frames), the subject 2 is in close proximity to the cluster of pixels when the cluster of pixels are initially identified, and a number of frames it may take for a cluster of pixels to become background is consistent with an expected number of frames for the ghost effect 56 to disappear. To be considered a ghost effect 56, a cluster of pixels may need to satisfy one, some, or all of the above referenced principles and/or other principles.

The monitoring or tracking system 10 may search for an object appearing on a portion of the frame (e.g., the ghost effect 56 of the object 4). In some cases, if it is known that a task begins on a left side or other portion of a frame of video, the monitoring or tracking system 10 may look for the object or ghost effect appearing in the left side or the other portion of the frame. Similarly, if it is known that a task ends on a right side or other portion of the frame, the monitoring or tracking system 10 may look for the object or ghost effect appearing in the right side or the other portion of the frame. If it is not known where in a frame a task is expected to begin and/or end, the monitoring or tracking system 10 may look for the object or ghost effect in the entire frame.

Figure 13A:
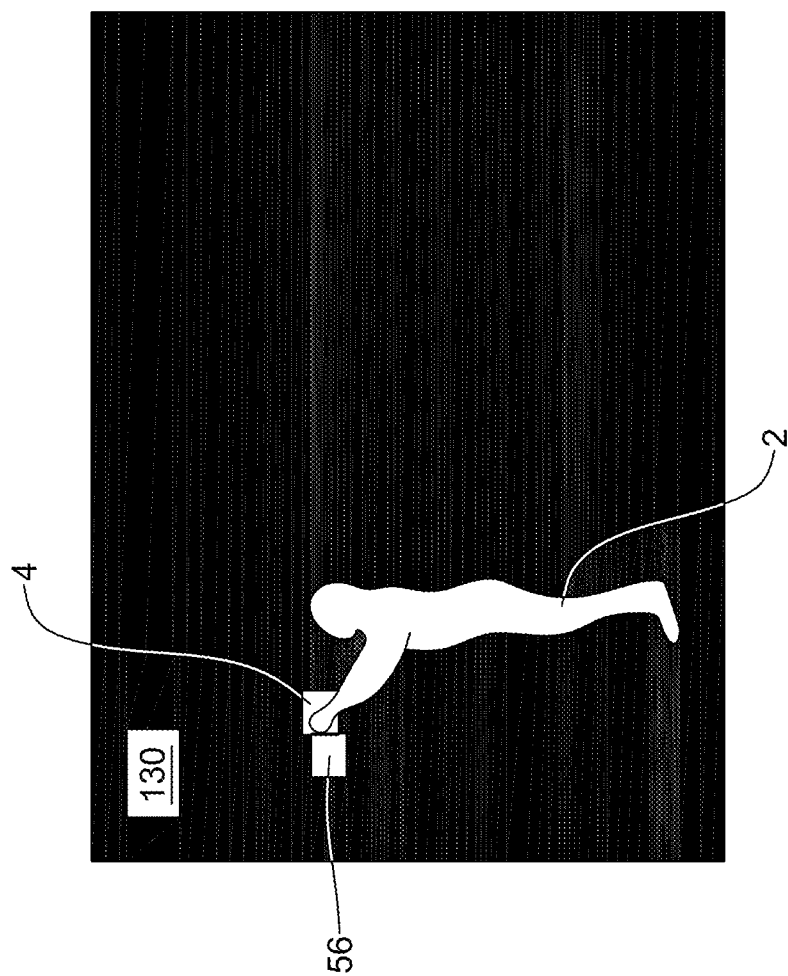
FIGS. 13A-13E are schematic views of illustrative segmented frames of video showing an illustrative ghost effect appearing and disappearing in the frames of video over time.
Figure 13B:
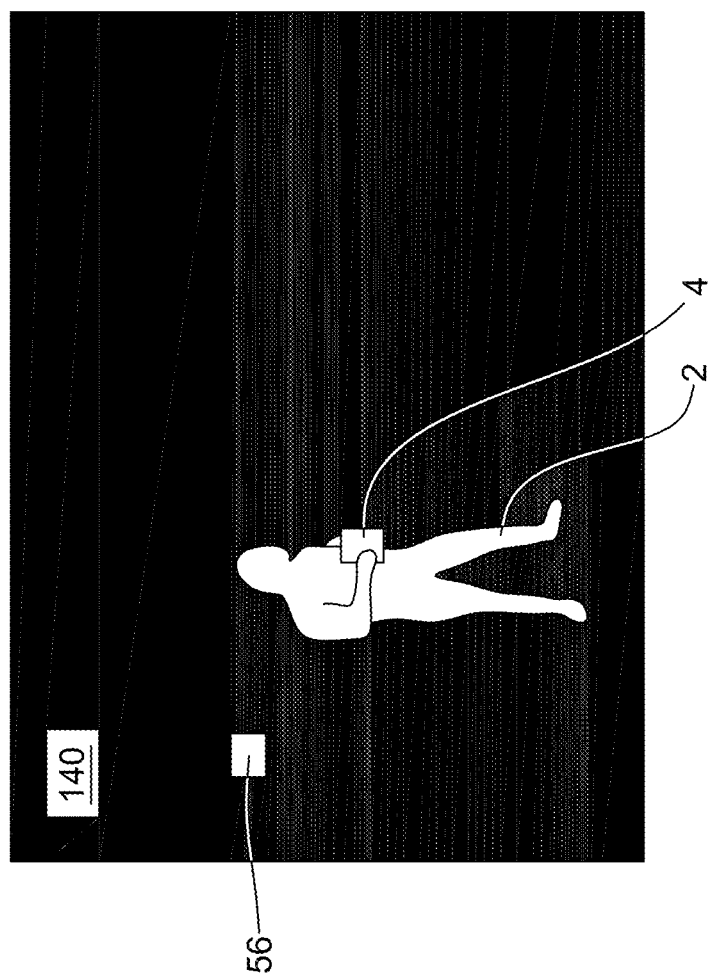
Figure 13C:
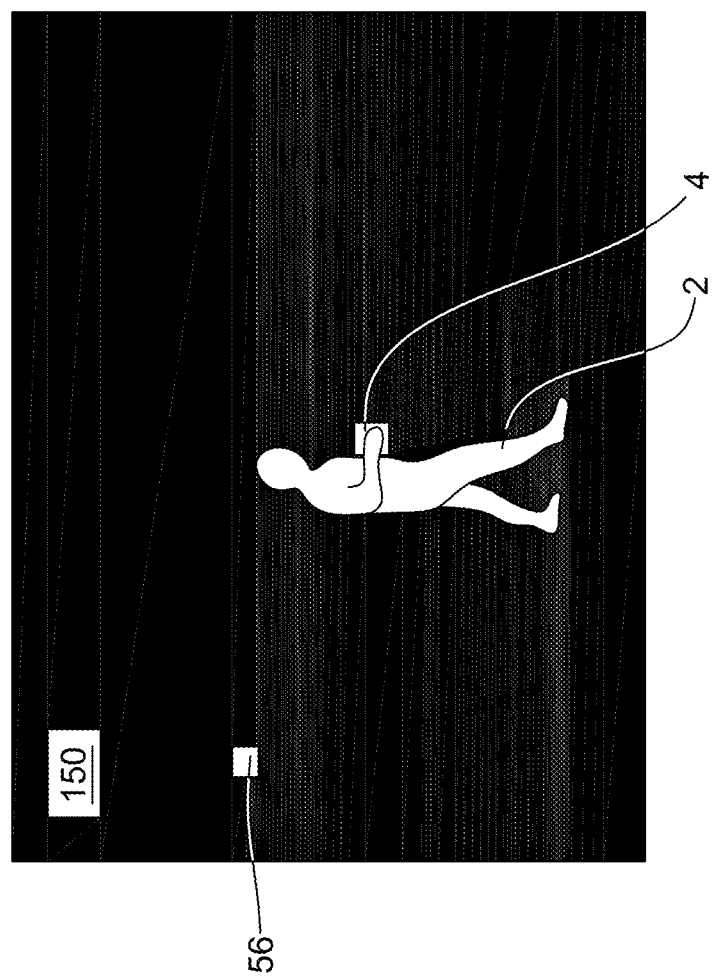
Figure 13D:
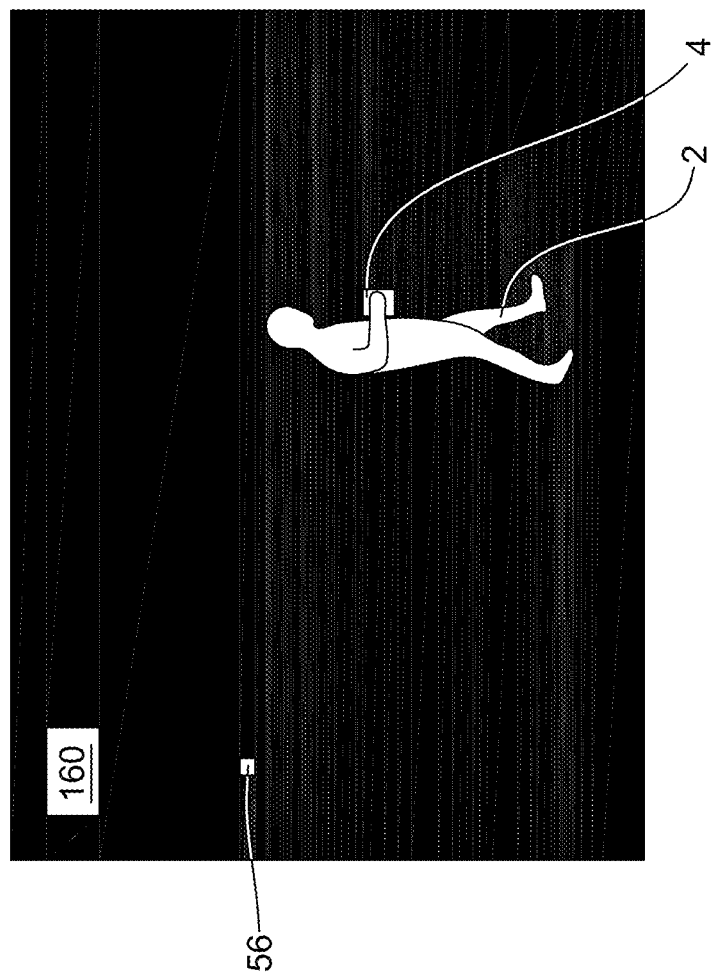
Figure 13E:
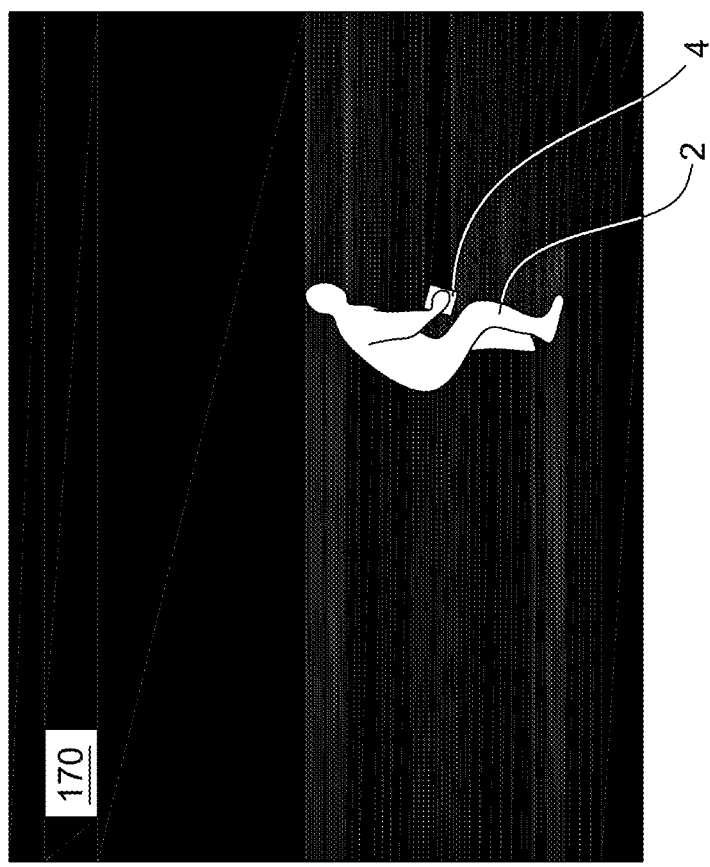

FIGS. 13A-13E depict example frames with the subject 2 and the ghost effect 56 as the ghost effect 56 is first identified and fades away over time. FIG. 13A depicts a frame with the ghost effect 56 near in time to when the ghost effect initially appears and the subject 2 picks up the object 4. Ten (10) frames after the frame of FIG. 13A, the frame of FIG. 13B depicts the ghost effect 56 being separate from the subject 2 and object 4. Ten (10) frames after the frame of FIG. 13B, the frame of FIG. 13C depicts the ghost effect 56 starting to fade into the background. Ten (10) frames after the frame of FIG. 13C, the frame of FIG. 13D depicts the ghost effect 56 almost completely faded into the background. Ten (10) frames after the frame of FIG. 13D, the frame of FIG. 13E no longer depicts the ghost effect 56. Although FIGS. 13A-13E depict the ghost effect 56 completely or substantially disappearing into the background after fifty (50) frames, the ghost effect 56 may be configured to be depicted for a longer or shorter amount of time (e.g., in more or fewer frames).

As the subject's 2 hands may be at the location of the ghost effect 56 to move the object 4 at the beginning of a task (e.g., the location of the ghost effect 56 in FIG. 13A) and at the location of the ghost effect 56 to place the object 4 at the ending of a task (e.g., the location of the ghost effect 56 in FIG. 13D), a hand location of the subject 2 may be determined (e.g., inferred) from the location of the ghost effects 56. The ghost effect 56 may initially occur at a beginning of task (e.g., when an object 4 starts to move) and/or at an end of a task (e.g., when an object 4 first becomes stationary and separated from the subject 2), a first frame in which the ghost effect 56 is identified (e.g., a first frame in a sequence of frames in which the ghost effect 56 appears) and a position of the ghost effect 56 in the first frame may be recorded as the time of a beginning or ending of a task and a location of the hands of the subject 2 at that time, respectively. Further, the ghost effect 56 may have a shape (e.g., form a region of interest about a hand of the subject 2) when it initially appears in the video and the shape of the ghost effect 56 at this point may be tracked (e.g., a center of the shape of the ghost effect 56 and/or other suitable portion of the ghost effect 56 may be tracked) from the beginning of the task to the ending of the task to determine locations of the ghost effect 56, and thus the locations of the hands of the subject 2, over performance of the task by the subject 2. Alternatively or additionally, the locations of the hands of the subject 2 at a time during the task may be determined from a function of or algorithm based on a hand location of the subject 2 at the beginning of the task, a hand location of the subject 2 at the end of the task, one or more dimensions of the subject 2 at the beginning of the task, one or more dimensions of the subject 2 at the ending of the task, one or more dimensions of the subject 2 during the task, and/or one or more other suitable parameters.

When a location of the object 4 is tracked during the performance of a task by the subject 2 via tracking a shape of the object 4, the object 4 may blend in with one or more portions of foreground at one or more times during performance of the task. For example, this may occur when the subject 2 switches from facing a first direction to facing a second direction and/or may occur at other times. Losing a location of the object 4 during the task may be problematic because a location of the object 4 may indicate or imply a location of the hands of the subject 2 during the performance of the task. Although the object 4 may blend in with other portions of the foreground during the task, temporal information and/or appearance information may be utilized to extrapolate or interpolate position information concerning the object 4 when the shape of the object 4 cannot be identified after it has been initially recognized.

Additionally or alternatively to identifying the beginning and ending of a task based on identifying ghost effects and although not required, a determination of the frame(s) where the task may start and/or end may be based at least partially on information known about a task. For example, as it may be known that the subject 2 or a portion of the subject 2 performing a repetitive task reverses direction after starting and/or ending the task, a start and an end of a task may be initially identified or confirmed by tracking a horizontal location of the subject in the frames of the video.

Once the locations of the hands of a subject 2 during a beginning and/or an ending of a task are identified, a vertical and/or horizontal distance between the locations of the hands and a location of the feet of the subject 2 may be determined. When the monitoring or tracking system 10 is performing a task analysis, such as a lifting analysis or trunk angle analysis, the vertical and horizontal distances between the feet and hands when loading and unloading an object may be necessary to calculate a recommended weight limit, a trunk angle, trunk kinematics (e.g., trunk speed, trunk acceleration, etc.) and/or may be utilized by the monitoring or tracking system 10 to perform other analyses. In some cases, the vertical and horizontal distances between the feet and hands of the subject may be considered examples of vertical and horizontal, respectively, locations of the hand of the subject 2.

Although the monitoring or tracking system 10 may determine a hand location within a frame as discussed above and/or in one or more other suitable manners, a location of the feet within the frame(s) of video may need to be determined to provide a relative positioning of the hands. The vertical location of the feet may be considered to be the same as the base of the bounding box (e.g., a margin pixel in the negative y-direction). The horizontal coordinate of the feet location may be determined in one or more manners including, but not limited to, by using a weighted sum of a horizontal silhouette pixel index. The horizontal silhouette pixel index is, for example:

$$\text{Feet Center}_{horizontal} = \frac{\sum_{k=\text{most left pixel index}}^{\text{most right pixel index}} i \times \text{weight}_i}{\sum_{k=\text{most left pixel index}}^{\text{most right pixel index}} \text{weight}_i} \quad (9)$$

The $\text{weight}_i$ may be the total number of pixels that is covered by the silhouette 40 at corresponding horizontal index i.

Figure 14:
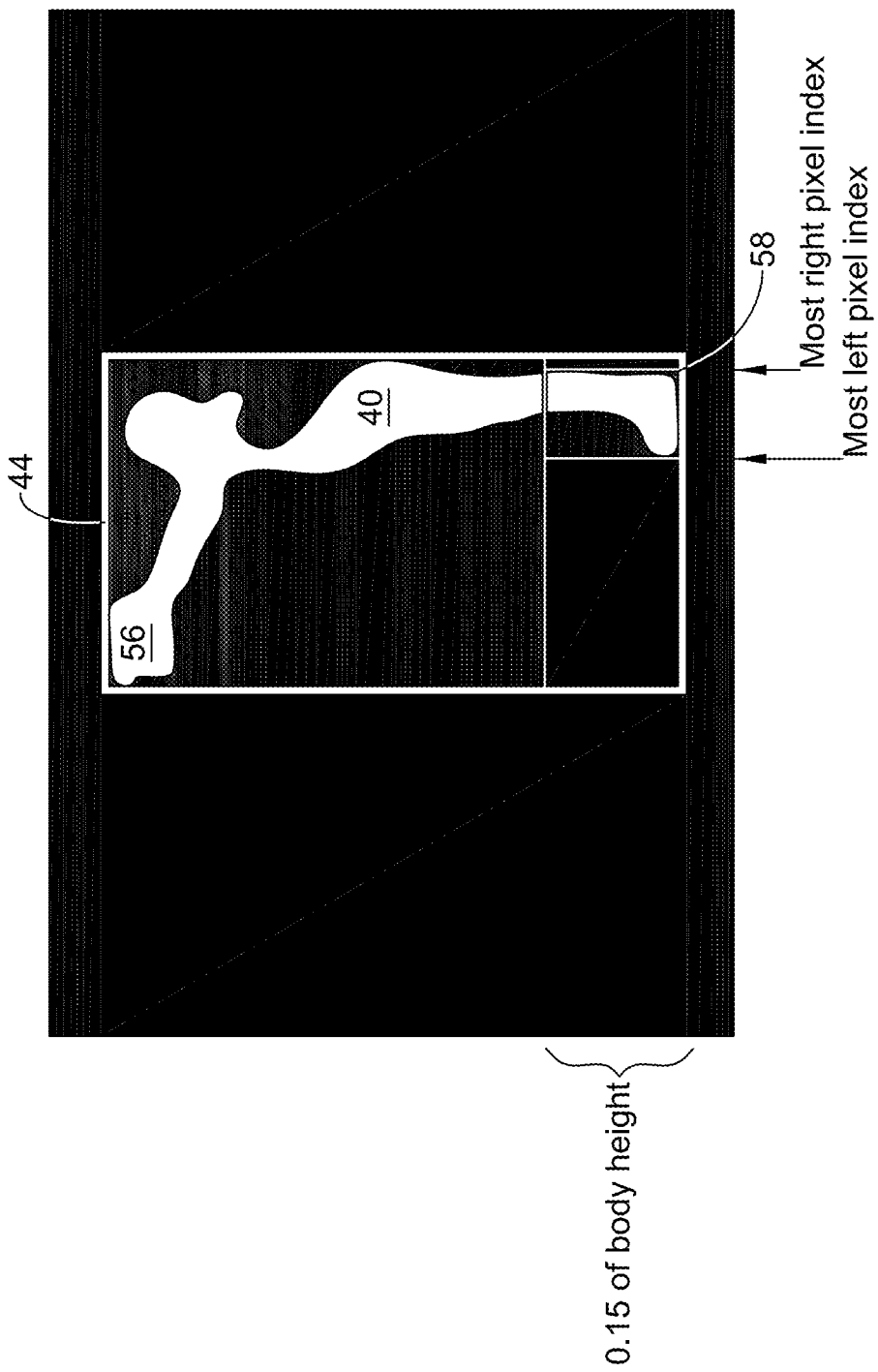
FIG. 14 is a schematic view of an illustrative segmented frame of video depicting a silhouette of a subject loading an object and in which a feet location of the subject is being determined.
Figure 15:
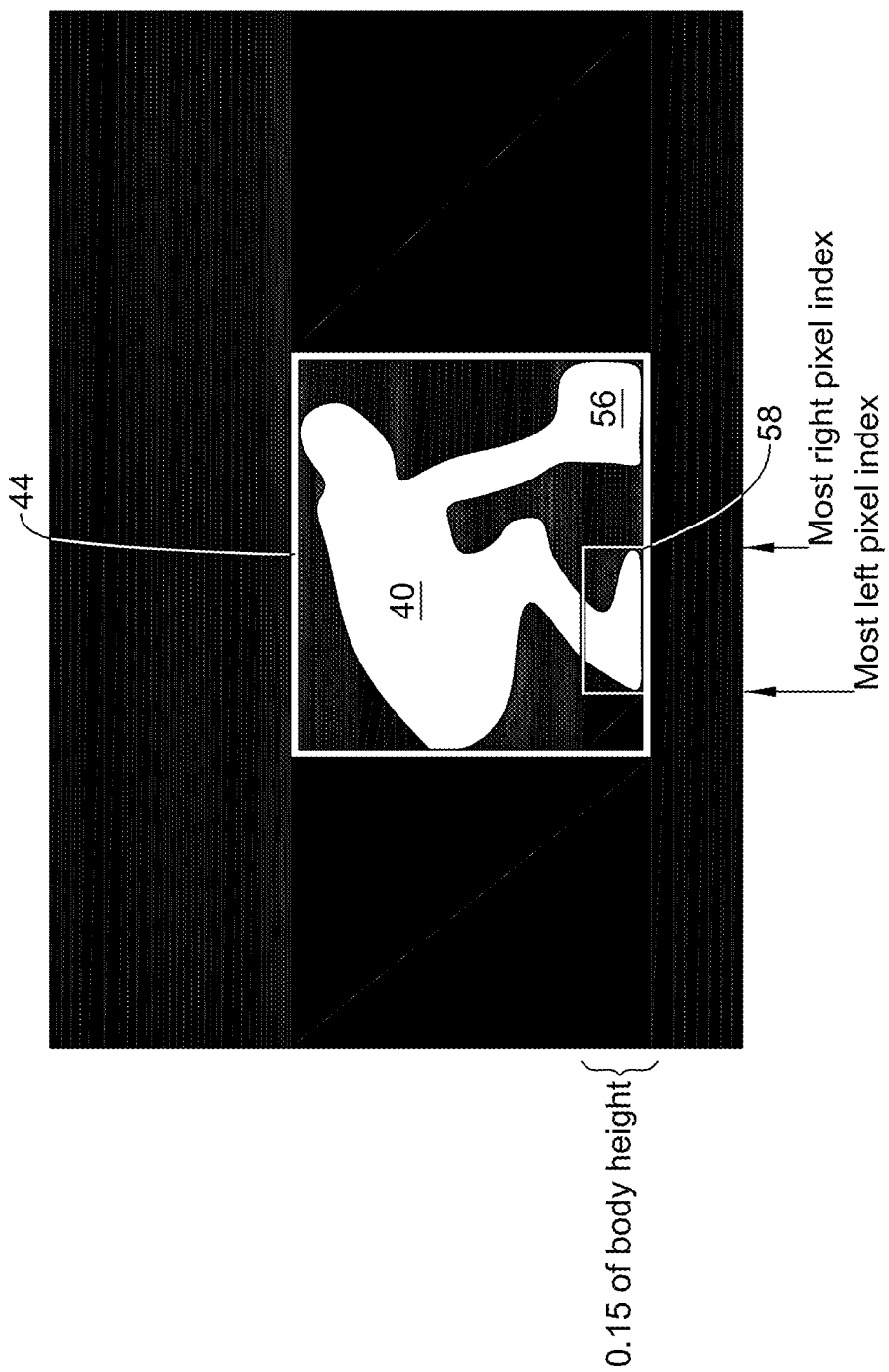
FIG. 15 is a schematic view of an illustrative segmented frame of video depicting a silhouette of a subject unloading an object and in which a feet location of the subject is being determined.

Before applying the above formula, however, the monitoring or tracking system 10 may need to determine a region of interest where the feet center may lie. This may be entered manually through a user interface or the monitoring or system 10 may determine, on its own, the region of interest where the feet center lies. In one example, the monitoring or tracking system 10 may set the region of interest where the feet center lies as an area of the subject's feet and shanks (e.g., shins) as represented by the silhouette 40. FIGS. 14 and 15 depict the region of interest 58 of a silhouette 40 bounded with a bounding box 44 for determining a center of the feet when the silhouette 40 is beginning a task by loading an object represented by ghost effect 56 (FIG. 14) and when the silhouette 40 is ending a task by unloading the object represented by the ghost effect 56 (FIG. 15). The monitoring or tracking system 10 may then determine the mass center of this area using equation (9).

The shank and feet area (e.g., the region of interest) may be determined in any manner. In one example, a statistical method may be used to find the height of the shanks of the subject 2 as represented by the silhouette 40. For example, a shank height may be considered to be a percentage of a total height of the subject. In some cases, the shank height may be considered to be 0.10, 0.15, and/or other fraction of a height of the silhouette 40 of the subject 2. Thus, a vertical dimension of the region of interest where the feet center may lie may span from 0.15 of a height of the silhouette 40 of the subject 2 in the frame and a vertical dimension of the base of the bounding box 44. The horizontal dimension of the region of interest may span from a marginal pixel of the silhouette 40 in a x-positive direction (e.g., the right-most pixel index) within the vertical dimension of the region of interest and a marginal pixel of the silhouette 40 in a x-negative direction (e.g., the most left pixel index) within the vertical dimension of the region of interest 58, as depicted in FIG. 14.

In the situation where the subject 2 may be squatting and working with an object 4 near the ground, as shown in FIG. 15, it is contemplated the hands of the silhouette 40 representing the subject 2 and/or the ghost effect 56 representing the object 4 may be located in the region of interest 58. To facilitate determining a horizontal location of the feet when the hands and/or the object are located in the region of interest 58, the region of interest 58 may be adjusted (e.g., horizontally reduced) based on a size of the object 4 as represented by the ghost effect 56. The size of the object 4 may be determined by multiplying a distance from the center of the ghost effect 56 (e.g., which may have been determined to locate the hands) to an edge of the bounding box 44 by two (2), as the outer edge of the object 4 may typically be considered a margin pixel defining an edge of the bounding box 44.

Once the region of interest 58 is identified, a distance between the hands and feet of the subject 2 may be determined. The distance between the hands and feet of the subject 2 may then be used to determine a trunk angle, assess movement, perform risk assessments, and/or perform other suitable analyses of the subject 2 in the video.

Although segmentation of frames of video facilitates identifying subjects 2 and objects 4 in video based on movement of the subjects 2 and/or objects 4 relative to a background, one limitation is that if one of the subjects 2 and/or objects 4 of interest, or portions thereof, stops moving for a set number of frames (e.g., a predetermined number of two or more frames, which may depend on a background update rate), that subject 2 and/or object 4, or portions thereof, may be absorbed into the background. As a result, features that are meant to be in the foreground may be identified or tracked may become background and untrackable.

In one instance of features meant to be in the foreground but that become background, among others, feet may be stationary at one or more times while the subject 2 is performing a monitored task and thus, the feet may be absorbed into the background. Losing a location of the feet may be problematic because a useful measurement in monitoring the subject 2 performing a task is a horizontal and/or vertical distance between the subject's hands and feet, as discussed above. Additionally or alternatively, when the feet disappear from a foreground in segmented video, a bound around the subject 2 may change and the subject 2 may be assigned an inaccurate posture and/or other parameter measurements may be affected. Although the feet disappear from the silhouette 40 representing the subject 2 due to a lack of motion of the feet, temporal information and/or appearance information may be utilized to retrieve the feet and maintain the feet in the foreground when the feet are stationary.

To account for the situation when feet and/or other portions of a silhouette representing a subject disappear from the foreground when it is desirable for such portions of the silhouette to be in the foreground, a location of the feet and/or other portions of the subject may be identified by utilizing an estimation of the location of the feet. For example, a location of the feet and/or other portions of the subject in a previous frame and/or a function thereof may be added to and/or substituted into a current frame when the feet and/or other portions of the subject have disappeared from the foreground in the current frame. In some cases, Bayesian-based estimation may be utilized to ensure the foreground in each frame of video includes a silhouette of the feet of the subject. Although we discuss estimating locations of the feet of a subject, other portions of the subject may be located through estimation in a manner similar to as discussed herein with respect to the feet of the subject.

One example formula that may be used to estimate a location of the subject's feet is as follows:

$$\text{Posterior probability} = \text{prior probability} \times \text{likelihood} \quad (10)$$

where the prior probability term in equation (10) may be an estimated feet location of a silhouette 40 in a current frame of video based on a previous frame of video. In one example, the estimated feet location may be the location of the feet of the silhouette 40 (e.g., region of interest 58 or other location) in the previous frame or a different function of the location of the feet of the silhouette 40 in the previous frame. Because the feet may not move fast from frame-to-frame for a conventional video frame rate (e.g., a frame rate in a range from 15 frames per second (fps) to 30 fps), the difference between the feet location of a silhouette 40 in the current frame and that of the previous frame may be expected to be small (e.g., as measured in change of pixel locations from frame-to-frame), with an average of about zero (0) pixels. As such, a plausible location for a feet portion of the silhouette 40 in the current frame may be defined by one or more pixels extending from the feet location of the silhouette 40 in a previous frame. As discussed above, the region of interest 58 may identify a plausible location of the feet of the subject 2 represented by the silhouette 40 in the current frame. This region of interest 58 may be the bottom 10% of the area covered by the bounding box of the previous frame (the area shares the same width and 0.1 of the height of the bounding box) or other suitable percentage of the area covered by the bounding box of the previous frame.

Figure 16:
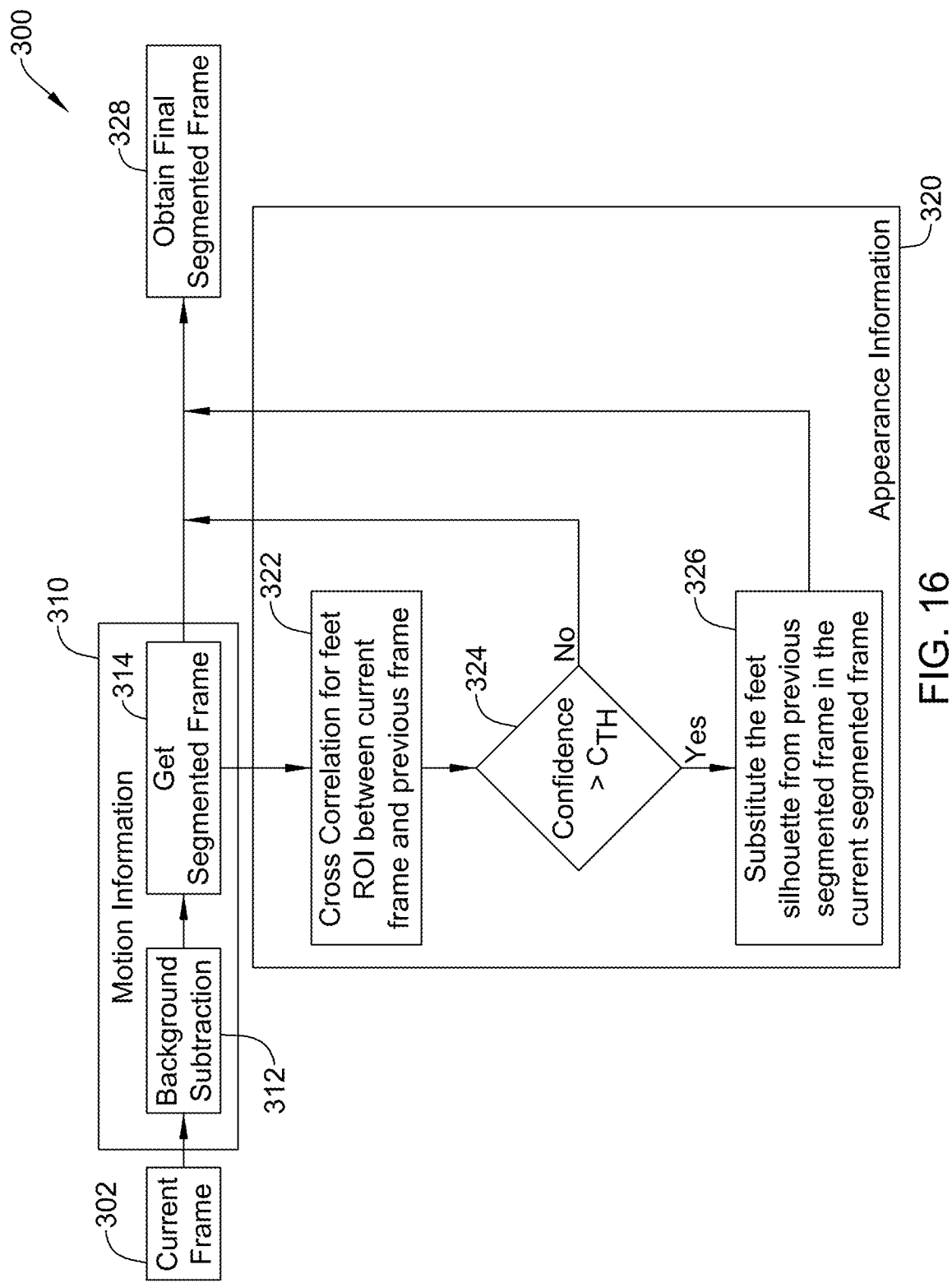
FIG. 16 is a schematic flow diagram of an illustrative method of representing portions of a subject in a frame of video.

The likelihood term in equation (10) may be provided by motion information and appearance information. In some cases, the motion information and the appearance information may be weighted relative to each other, but this is not required. In one example, the appearance information may have a greater weight (e.g., have a higher priority) than the motion information. To compare a current frame appearance in the region of interest 58 with a previous frame appearance within the region of interest 58 (e.g., where the previous frame appearance within the region of interest 58 may be from a frame immediate before the current frame, may be from a frame at X-number of frames before the current frame, may be an average of previous frame appearances within the region of interest 58 over X-number of frames, a rolling average of previous frame appearances within the region of interest 58 over X-number of frames, or other suitable previous frame appearance within the region of interest 58), a pixel-by-pixel intensity cross-correlation of the region of interest 58 of the current frame and of the region of interest 58 of the previous frame may be utilized. If a confidence value of the cross-correlation (e.g., a confidence level obtained as a direct result of the pixel-by-pixel intensity cross-correlation as compared to an expected result of the pixel-by-pixel intensity cross-correlation) goes beyond (e.g., is greater than, as depicted in FIG. 16, or less than) a pre-set confidence threshold (e.g., the pre-set threshold may be set as 0.85, 0.9, 0.95, and/or set at one or more other suitable threshold values), then the feet portion of the silhouette in the region of interest 58 of the current frame may be estimated to be the same as that of the previous frame and the region of interest 58 of the previous frame may be utilized for the region of interest 58 of the current frame. This happens when the feet of the subject are steady and the motion information is disregarded. If the confidence value of cross-correlation has not reached (e.g., is lower than, as depicted in FIG. 16, or is greater than) the pre-set confidence threshold, then the feet portion of the silhouette 40 in the region of interest 58 for the current frame may be utilized as the feet of the silhouette 40 in the current frame. This happens when the feet of the subject 2 are moving and motion information is considered.

The pixel-by-pixel intensity cross-correlation and confidence level determination of the region of interest 58 in different frames of video may be performed using digital image correlation and tracking (DIC) techniques and/or other suitable cross-correlation techniques. Although cross-correlation and the use of confidence levels is discussed herein for comparing the regions of interest 58 in a current frame and a previous frame of video to determine feet locations of the subject 2, other comparing techniques may be utilized to determine locations of feet of the subject 2 and/or locations of other features of the subject 2.

Returning to the illustrative approach 200 depicted in FIG. 7, once the subject 2 has been bound 206 (e.g., by a bounding box or extreme-most pixels) to determine one or more dimensions of the subject 2 and hands of the subject 2 have been located 208 (e.g., where the location of the hands may include a vertical location being a vertical distance between hands and feet of the subject and a horizontal location being a horizontal distance between hands and feet of the subject), values of such parameters extracted from the received video may be analyzed 210. In some cases, such parameters may be analyzed by applying values of the extracted parameters to an application of equation (1), equation (8), and/or other suitable equation to determine trunk angle and/or trunk kinematic values, the NIOSH Lifting Equation, the ACGIH TLV for manual lifting, and/or other analysis tools for assessing injury risk and/or mitigating injury of a subject performing a task. In one example, an application of equation (1) (e.g., equation (3), equation (4), and/or other suitable application of equation (1)) may result in a trunk angle and/or trunk kinematic determining function that is based on a value of a width dimension of the subject 2 (e.g., as measured by a bounding box and/or extreme-most pixels of the subject 2 in the width dimension) and a hand location of the subject 2 (e.g., a vertical location of a hand of the subject 2 and a horizontal location of the hand of the subject 2). In the example, the values of the trunk angle and/or trunk kinematics may provide and/or may be utilized to determine injury risk assessments for a subject performing a task.

FIG. 16 depicts a flow diagram of an approach 300 for ensuring feet of the subject 2 appear in the silhouette 40 even when the subject's feet are or are substantially static or stationary across a predetermined number of frames. In the approach 300, a current frame may be provided for analysis and background subtraction. As shown in a motion information box 310, background subtraction may be performed 312 on the frame to obtain 314 a segmented frame, including a region of interest 58 for the feet of the subject 2 represented by the silhouette 40. As shown in an appearance information box 320, a cross-correlation for the region of interest 58 in the segmented frame of the current frame and the region of interest 58 in a segmented frame of a previous frame may be obtained and a confidence level in the correlation may be determined and compared 324 to a confidence level threshold $C_{TH}$. In the case depicted in FIG. 16, the confidence level in the cross-correlation may be determined by comparing the result of the cross-correlation to an expected cross-correlation indicating the feet of the subject 2 as represented by the silhouette 40 have disappeared from the foreground in the current frame, but other arrangements for determining a confidence level are contemplated. When the determined confidence level has gone beyond (e.g., is greater than) the confidence level threshold $C_{TH}$, the region of interest 58 and/or a portion of the silhouette 40 within the region of interest 58 of the segmented previous frame may be substituted 326 into the segmented current frame and the final segmented frame may be obtained 328. When the determined confidence level has not gone beyond (e.g., is equal to or less than) the confidence level threshold $C_{TH}$, the region of interest 58 in the segmented current frame may be the obtained 328 final segmented frame. This technique for ensuring that stationary feet of the subject 2 appearing in a segmented frame when the feet have not moved or have not moved a threshold amount over a predetermined number of frames is an example technique, and other techniques are contemplated.

FIG. 17 is an approach 400 utilizing the monitoring or tracking system 10 to assess movement of a subject during an event of interest (e.g., a lifting task or other event of interest). Although not shown, the approach may include receiving a video including an event of interest. The monitoring or tracking system 10 (e.g., a non-transitory computer readable medium having instructions stored thereon to perform the techniques discussed herein) may compare 402 pixels in frames of video to possible pixel values based on an identified distribution to identify a subject within the frames of the video. As discussed above, the monitoring or tracking system 10 may compare successive frames of the video by comparing corresponding pixels of the successive frames and/or by comparing the frames in one or more other manners. Once the subject has been identified, a beginning of an event of interest and an ending of the event of interest may be determined 404 (e.g., by identifying ghost effects and/or with one or more other techniques). The event of interest may be any event involving the subject. In some cases, the event of interest may be a lifting task that is repeated over time. The techniques discussed herein and/or other techniques may be utilized to determine a beginning and/or an ending of an event of interest. One or more coordinates (e.g., marginal pixels, center of pixel mass, etc.) of a subject within a frame may be tracked 406 through a plurality of frames of the video as the subject moves within the frames over a period of time from the beginning of the event of interest and the end of the event of interest. When the event of interest involves a lifting task, the subject may be tracked from a location at which an object is picked up (e.g., loaded) until a location at which the object is set down (e.g., unloaded). Further, if the event of interest is repeated, the subject may be tracked while the event of interest is repeated. Then, based on coordinates of the subject during the event of interest and extracted information based on the identified coordinates (e.g., including, but not limited to, one or more dimensions of the subject, hand locations of the subject, posture states of the subject, etc., as discussed herein), the monitoring or tracking system 10 may perform 408 an assessment (e.g., a risk assessment) of movement of the subject during the event of interest.

In some cases, the monitoring or tracking system 10 may identify or extract parameter values from the video including, but not limited to, frequency (e.g., from the horizontal location tracking), speed (e.g., an amount of time between a beginning of an event and an end of the event), acceleration, and/or other parameter of the subject during the event of interest. Based on these parameters, posture, distance between hands and feet of the subject, and/or other parameters, the monitoring or tracking system 10 may determine a trunk angle of the subject, trunk kinematics of the subject, a recommended weight limit, a lifting index, and/or perform one or more other assessments (e.g., injury risk assessments and/or other suitable assessments) of movements of the subject during the event of interest. The monitoring or tracking system 10 may then provide an output (e.g., an alert, report, etc.) in response to the assessment and/or save the assessment to memory. Further, the monitoring or tracking system 10 may be configured to capture and/or receive video in real time during an event of interest and perform real time processing and/or assessments, in accordance with the approach 500 and as discussed herein, with the goal of preventing injuries and/or mitigating injury risks during the event of interest. In some cases, "real time" may include during recording of video and/or during playback of video.

Further, during the process of the monitoring or tracking system 10 processing the video, the video may be converted to frames similar to as depicted in FIGS. 9, 10, 13A-13E, 15, and 16, where the background and the foreground have been distinguished, and displayed on a display (e.g., the display 30 or other display) for observation while the monitoring system analyzes the video. Alternatively, the original video may be displayed and the comparison of corresponding pixels in successive frames may be done in a process that is not displayed. Further, one or more of the bounding step and the hand location step (e.g., marking of an identified center of the hands) may be depicted on a display even if the comparison of corresponding pixels in successive frames is not depicted in a manner similar to what is depicted in FIGS. 9, 10, 13A-13E, 15, and 16, but rather the original video is displayed if any video is displayed. In some cases, the monitoring or tracking system 10 may output via the output port 22 assessments and/or alerts based on assessments without displaying a portion of, or any portion of, an analysis of the video.

Although the monitoring or tracking system 10 is discussed in view of manual lifting tasks, similar disclosed concepts may be utilized for other tasks involving movement. Example tasks may include, but are not limited to, manual lifting, sorting, typing, performing surgery, throwing a ball, etc. Additionally, the concepts disclosed herein may apply to analyzing movement of people, other animals, machines, and/or other devices.

Further discussion of monitoring or tracking systems, techniques utilized for processing data, and performing assessments (e.g., injury risk assessments) is found in U.S. patent application Ser. No. 15/727,283 filed on Oct. 6, 2017, and is titled MOVEMENT MONITORING SYSTEM, now U.S. Pat. No. 10,482,283, which is hereby incorporated by reference in its entirety, U.S. patent application Ser. No. 16/038,664 filed on Jul. 18, 2018, and is titled MOVEMENT MONITORING SYSTEM, now U.S. Pat. No. 10,810,414, which is hereby incorporated by reference in its entirety, and U.S. patent application Ser. No. 16/874,883 filed on May 15, 2020, and is titled MOVEMENT MONITORING SYSTEM, which is hereby incorporated by reference in its entirety.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A subject tracking system comprising:
an input port for receiving data related to a subject performing a task;
a controller in communication with the input port, the controller is configured to:
determine a value for each of one or more dimensions of the subject performing the task based on the data;
determine a location of a hand of the subject performing the task based on the data; and
determine one or both of a trunk angle of the subject performing the task and one or more values of trunk kinematics of the subject performing the task based on the value for at least one dimension of the one or more dimensions of the subject performing the task and the location of the hand of the subject performing the task, and
wherein the trunk angle is an angle between a line or plane extending through a spine of the subject and a line or plane perpendicular to a surface supporting the subject.

2. The system of claim 1, wherein the one or more values of trunk kinematics of the subject performing the task include a value of a velocity of movement of a trunk of the subject performing the task.

3. The system of claim 1, wherein the one or more values of trunk kinematics of the subject performing the task include a value of an acceleration of movement of a trunk of the subject performing the task.

4. The system of claim 1, wherein the one or more dimensions of the subject performing the task include one or both of a height dimension of the subject and a width dimension of the subject.

5. The system of claim 1, wherein the one or more dimensions of the subject performing the task include a width dimension of the subject.

6. The system of claim 1, wherein the location of the hand of the subject performing the task includes a horizontal location of the hand of the subject and a vertical location of the hand of the subject.

7. The system of claim 1, wherein:
the one or more dimensions of the subject performing the task include a width dimension of the subject;
the location of the hand of the subject performing the task includes a horizontal location of a hand of the subject and a vertical location of the hand of the subject; and
the controller is configured to use the following equation to determine the trunk angle of the subject performing the task:

$$T = a + b*f(H) + c*f(V) + d*f(w),$$

where:
a, b, c, and d are constants;
H is a value of the horizontal location of the hand of the subject performing the task;
V is a value of the vertical location of the hand of the subject performing the task;
w is a value of the width dimension of the subject performing the task; and
T is a value of a trunk angle of the subject performing the task.

8. The system of claim 1, wherein:
the data related to the subject performing the task includes video data; and
the controller is configured to determine the one or more dimensions of the subject performing the task using pixel information from the video data.

9. The system of claim 8, wherein the controller is configured to automatically determine one or both of the trunk angle of the subject performing the task and the one or more values of trunk kinematics of the subject performing the task in real time during playback of the video data.

10. The system of claim 1, wherein the trunk angle is one of a trunk flexion angle and a spine flexion angle.

11. A computer readable medium having stored thereon in a non-transitory state a program code for use by a computing device, the program code causing the computing device to execute a method for determining one or both of a trunk angle of a subject and trunk kinematics of the subject comprising:

obtaining data related to the subject performing a task;
determining a value for each of one or more dimensions of the subject performing the task based on the data;
determining a location of a hand of the subject performing the task based on the data; and
determining one or both of the trunk angle of the subject performing the task and one or more values of trunk kinematics of the subject performing the task based on the value for at least one dimension of the one or more dimensions of the subject performing the task and the location of the hand of the subject performing the task, and
wherein the trunk angle is an angle between a line or plane extending through a spine of the subject and a line or plane perpendicular to a surface supporting the subject.

12. The computer readable medium of claim 11, wherein determining one or more values of trunk kinematics of the subject performing the task includes determining a velocity of movement of a trunk of the subject performing the task.

13. The computer readable medium of claim 11, wherein determining one or more values of trunk kinematics of the subject performing the task includes determining an acceleration of movement of a trunk of the subject performing the task.

14. The computer readable medium of claim 11, wherein the one or more dimensions of the subject performing the task includes one or more of a height dimension of the subject and a width dimension of the subject.

15. The computer readable medium of claim 11, wherein the location of the hand of the subject performing the task includes a horizontal location of the hand of the subject and a vertical location of the hand of the subject.

16. A tracking system comprising:
a processor;
memory in communication with the processor, the memory includes instructions executable by the processor to:
analyze pixel information in a video of a subject performing a task;
determine a value for each of one or more dimensions of the subject in a frame from the video based on the pixel information; and
determine a trunk angle of the subject in the frame based on the value for at least one dimension of the one or more dimensions of the subject in the frame, and
wherein the trunk angle is an angle between a line or plane extending through a spine of the subject and a line or plane perpendicular to a surface supporting the subject.

17. The system of claim 16, wherein the memory includes further instructions executable by the processor to automatically determine trunk angles of the subject in real time during playback of the video.

18. The system of claim 16, wherein the memory includes further instructions executable by the processor to determine one or both of a velocity of movement of a trunk of the subject over a plurality of frames from the video and an acceleration of movement of the trunk of the subject over a plurality of frames from the video.

19. The system of claim 16, wherein the one or more dimensions of the subject in the frame includes one or more of a height dimension of the subject and a width dimension of the subject.

20. The system of claim 16, wherein the memory includes further instructions executable by the processor to:
identify a ghost effect in the frame, the ghost effect having a location in the frame;
determine a location of a hand of the subject in the frame based on the location of the ghost effect;
determine extreme-most pixels in a width dimension of the subject in the frame;
assign a distance between the extreme-most pixels as a value of the width dimension; and determine the trunk angle of the subject in the frame based on the value of the width dimension of the subject in the frame and the location of the hand of the subject in the frame.

21. A subject tracking system comprising:
an input port for receiving data related to a subject performing a task;
a controller in communication with the input port, the controller is configured to:
determine a value for each of one or more dimensions of the subject performing the task based on the data;
determine a location of a hand of the subject performing the task based on the data; and
determine one or both of a trunk angle of the subject performing the task and one or more values of trunk kinematics of the subject performing the task based on the value for at least one dimension of the one or more dimensions of the subject performing the task and the location of the hand of the subject performing the task, and
wherein:
the one or more dimensions of the subject performing the task include a width dimension of the subject;
the location of the hand of the subject performing the task includes a horizontal location of a hand of the subject and a vertical location of the hand of the subject; and
the controller is configured to use the following equation to determine the trunk angle of the subject performing the task:

$$T=a+b*f(H)+c*f(V)+d*f(w)$$

where:
a, b, c, and d are constants;
H is a value of the horizontal location of the hand of the subject performing the task;
V is a value of the vertical location of the hand of the performing the task;
w is a value of the width dimension of the subject performing the task; and
T is a value of a trunk angle of the subject performing the task.

22. A subject tracking system comprising:
an input port for receiving data related to a subject performing a task;
a controller in communication with the input port, the controller is configured to:
determine a value for each of one or more dimensions of the subject performing the task based on the data;
determine a location of a hand of the subject performing the task based on the data; and
determine one or both of a trunk angle of the subject performing the task and one or more values of trunk kinematics of the subject performing the task based on the value for at least one dimension of the one or more dimensions of the subject performing the task and the location of the hand of the subject performing the task, and wherein:
the data related to the subject performing the task includes video data,
the controller is configured to determine the one or more dimensions of the subject performing the task using pixel information from the video data, and
the controller is configured to automatically determine one or both of the trunk angle of the subject performing the task and the one or more values of trunk kinematics of the subject performing the task in real time during playback of the video data.

23. A tracking system comprising:
a processor;
memory in communication with the processor, the memory includes instructions executable by the processor to:
analyze pixel information in a video of a subject performing a task;
determine a value for each of one or more dimensions of the subject in a frame from the video based on the pixel information; and
determine a trunk angle of the subject in the frame based on the value for at least one dimension of the one or more dimensions of the subject in the frame, and
wherein the memory includes further instructions executable by the processor to automatically determine trunk angles of the subject in real time during playback of the video.

24. A tracking system comprising:
a processor;
memory in communication with the processor, the memory includes instructions executable by the processor to:
analyze pixel information in a video of a subject performing a task;
determine a value for each of one or more dimensions of the subject in a frame from the video based on the pixel information; and
determine a trunk angle of the subject in the frame based on the value for at least one dimension of the one or more dimensions of the subject in the frame, and
wherein the memory includes further instructions executable by the processor to:
identify a ghost effect in the frame, the ghost effect having a location in the frame;
determine a location of a hand of the subject in the frame based on the location of the ghost effect;
determine extreme-most pixels in a width dimension of the subject in the frame;
assign a distance between the extreme-most pixels as a value of the width dimension; and
determine the trunk angle of the subject in the frame based on the value of the width dimension of the subject in the frame and the location of the hand of the subject in the frame.

* * * * *